(12) United States Patent
Heubel et al.

(10) Patent No.: US 8,665,241 B2
(45) Date of Patent: Mar. 4, 2014

(54) SYSTEM AND METHOD FOR PROVIDING HAPTIC FEEDBACK FROM HAPTIC TEXTILE

(71) Applicant: Immersion Corporation, San Jose, CA (US)

(72) Inventors: Robert W. Heubel, San Leandro, CA (US); Ryan Steger, Sunnyvale, CA (US); Muge Bakircioglu, San Jose, CA (US)

(73) Assignee: Immersion Corporation, San Jose, CA (US)

( * ) Notice: Subject to any disclaimer, the term of this patent is extended or adjusted under 35 U.S.C. 154(b) by 0 days.

(21) Appl. No.: 13/751,501

(22) Filed: Jan. 28, 2013

(65) Prior Publication Data

US 2013/0155020 A1 Jun. 20, 2013

Related U.S. Application Data

(63) Continuation of application No. 12/331,728, filed on Dec. 10, 2008, now Pat. No. 8,362,882.

(51) Int. Cl.
*G06F 3/045* (2006.01)

(52) U.S. Cl.
USPC ........... 345/174; 340/506; 340/517; 340/521; 340/539.1; 340/407.1

(58) Field of Classification Search
USPC .................. 340/506, 517, 521, 539.1, 407.1
See application file for complete search history.

(56) References Cited

U.S. PATENT DOCUMENTS

| | | | |
|---|---|---|---|
| 5,541,372 A | 7/1996 | Baller et al. | |
| 5,543,588 A | 8/1996 | Bisset et al. | |
| 6,007,728 A | 12/1999 | Liu et al. | |
| 6,210,771 B1 | 4/2001 | Post et al. | |
| 6,337,678 B1 | 1/2002 | Fish | |
| 6,429,846 B2 | 8/2002 | Rosenberg et al. | |
| 6,809,462 B2 | 10/2004 | Pelrine et al. | |
| 6,819,312 B2 | 11/2004 | Fish | |
| 7,205,981 B2 | 4/2007 | Cunningham | |
| 7,348,285 B2 | 3/2008 | Dhawan et al. | |
| 7,673,528 B2 | 3/2010 | Yoon et al. | |
| 2002/0054060 A1 | 5/2002 | Schena | |
| 2002/0130673 A1 | 9/2002 | Pelrine et al. | |
| 2003/0181116 A1 | 9/2003 | Van Heerden et al. | |
| 2005/0030292 A1 | 2/2005 | Diederiks | |
| 2005/0040962 A1 | 2/2005 | Funkhouser et al. | |

(Continued)

FOREIGN PATENT DOCUMENTS

| | | |
|---|---|---|
| DE | 102 09 0385 A1 | 9/2003 |
| JP | H5-296709 | 11/1993 |

(Continued)

OTHER PUBLICATIONS

International Preliminary Report on Patentability as issued for International Patent Application No. PCT/US2009/066907, dated Jun. 23, 2011.

(Continued)

*Primary Examiner* — Daryl Pope
(74) *Attorney, Agent, or Firm* — Pillsbury Winthrop Shaw Pittman LLP

(57) ABSTRACT

A system includes a haptic textile comprising a plurality of haptic threads configured to provide haptic feedback, and an ancillary electronic device configured to transfer data to or from the haptic textile.

19 Claims, 17 Drawing Sheets

(56) References Cited

U.S. PATENT DOCUMENTS

| | | |
|---|---|---|
| 2006/0037686 A1 | 2/2006 | Dhawan et al. |
| 2006/0254369 A1 | 11/2006 | Yoon et al. |
| 2006/0254898 A1 | 11/2006 | O'Leary |
| 2006/0258247 A1 | 11/2006 | Tao et al. |
| 2007/0042660 A1 | 2/2007 | Waxler |
| 2007/0063849 A1 | 3/2007 | Rosella et al. |
| 2008/0050550 A1 | 2/2008 | Orth |
| 2008/0068334 A1 | 3/2008 | Olien et al. |
| 2008/0120029 A1 | 5/2008 | Zelek et al. |
| 2009/0002328 A1 | 1/2009 | Ullrich et al. |
| 2009/0128503 A1 | 5/2009 | Grant et al. |
| 2009/0250267 A1 | 10/2009 | Heubel et al. |
| 2011/0148607 A1 | 6/2011 | Zeleny |

FOREIGN PATENT DOCUMENTS

| | | |
|---|---|---|
| JP | H7-185129 | 7/1995 |
| JP | 2000-112640 | 4/2000 |
| JP | 2003-113519 | 4/2003 |
| JP | 2005-293512 | 10/2005 |
| JP | 2006-502818 | 1/2006 |
| JP | 2006-185252 | 7/2006 |
| JP | 2007-529805 | 10/2007 |
| JP | 2008-529576 | 8/2008 |
| WO | WO 2008/070824 | 6/2008 |

OTHER PUBLICATIONS

De Rossi et al., "Wearable Mechanosensing and Emerging Technologies in Fabric-based Actuation," Intelligent Textiles for Personal Protection and Safety, IOS Press, 2006, pp. 55-64.

Carpi et al., "Electroactive Polymer-Based Devices for e-Textiles in Biomedicine," IEEE Transactions on Information Technology in Biomedicine, vol. 9, No. 3, Sep. 2005, pp. 295-318.

Search Report and Written Opinion as issued for PCT/US2009/066907, dated Mar. 5, 2010.

Introducing the TactaPad. [online] Tactiva [retrieved on Oct. 4, 2007]. Retrieved from the Internet: <URL: http://www.tactiva.com/tactapad.html>.

Office Action as issued for Japanese Patent Application No. 2011-540790, dated Nov. 26, 2013.

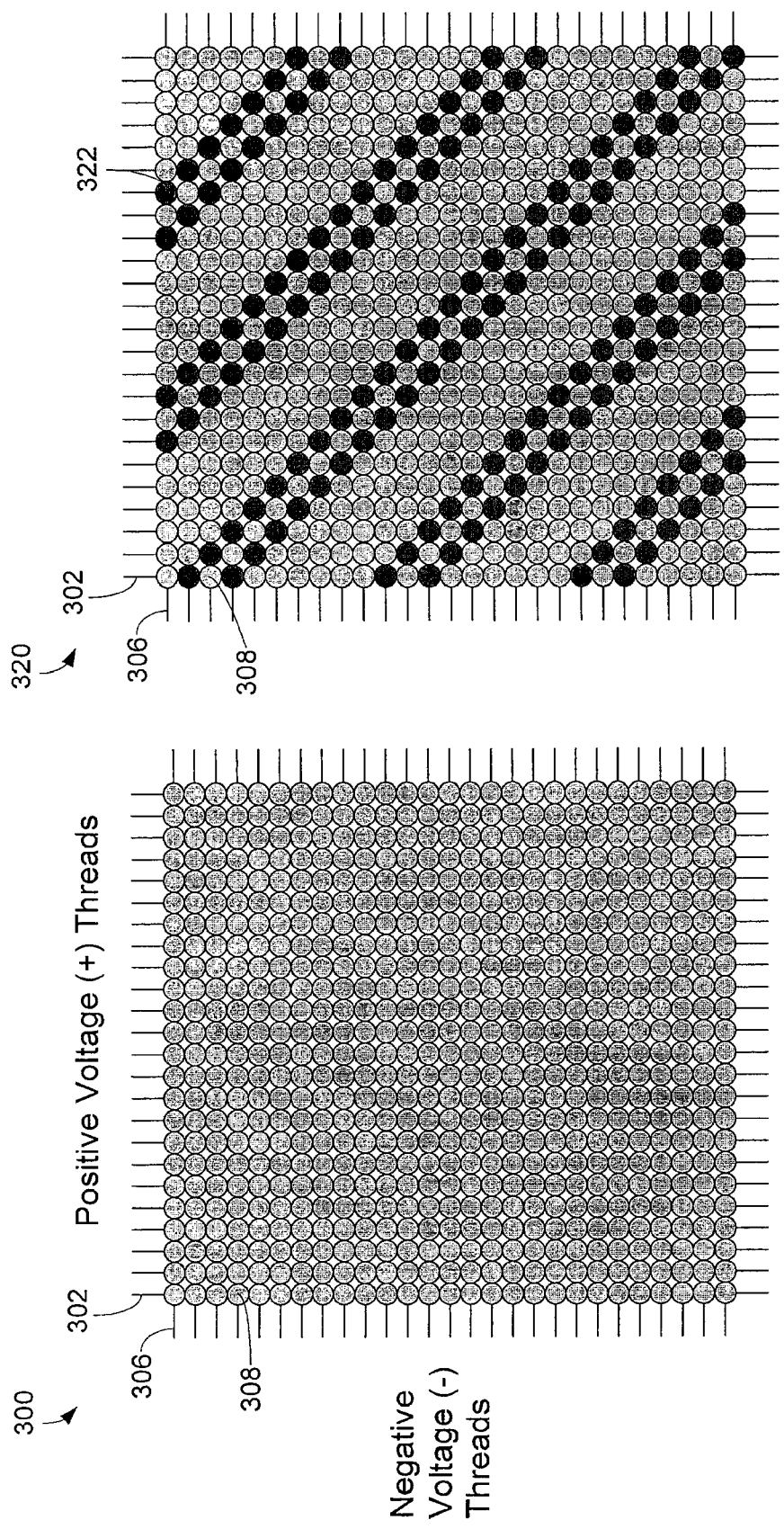

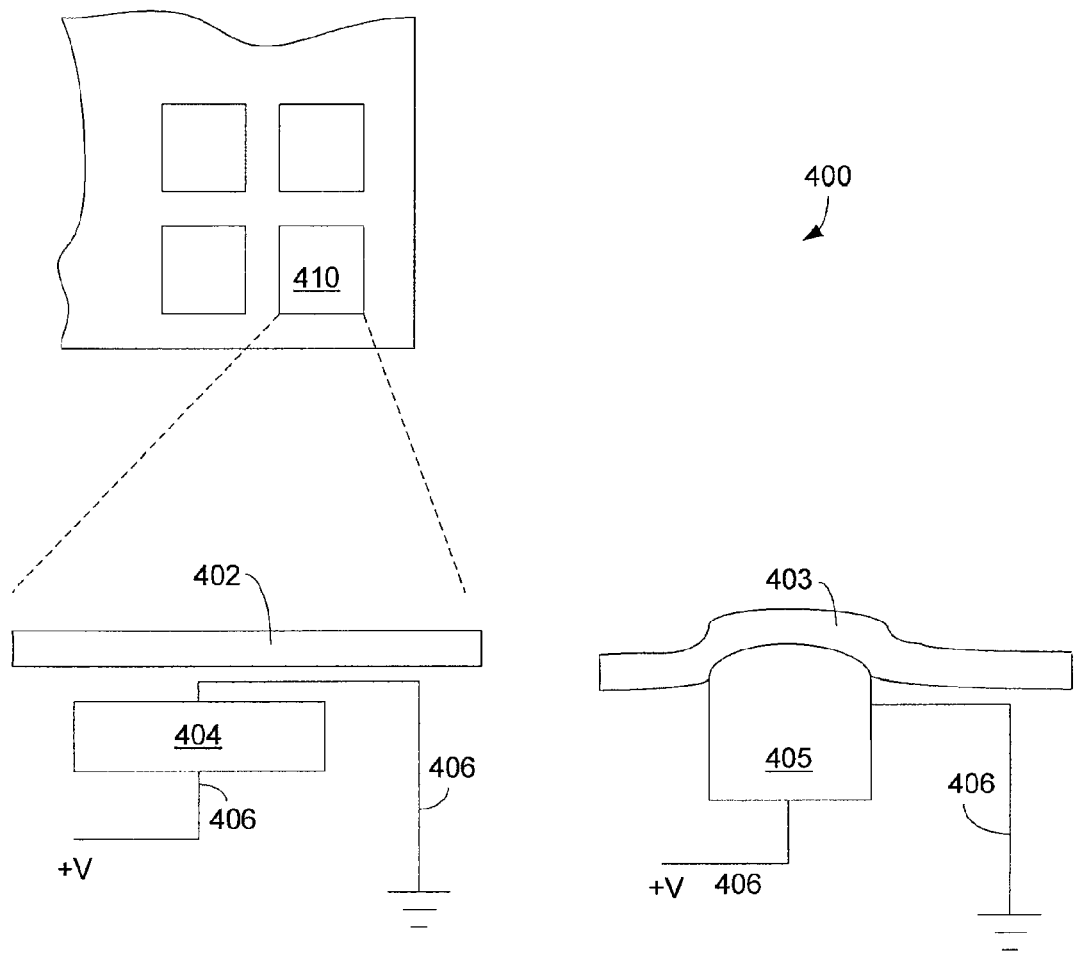
FIG 4(a)  FIG 4(b)

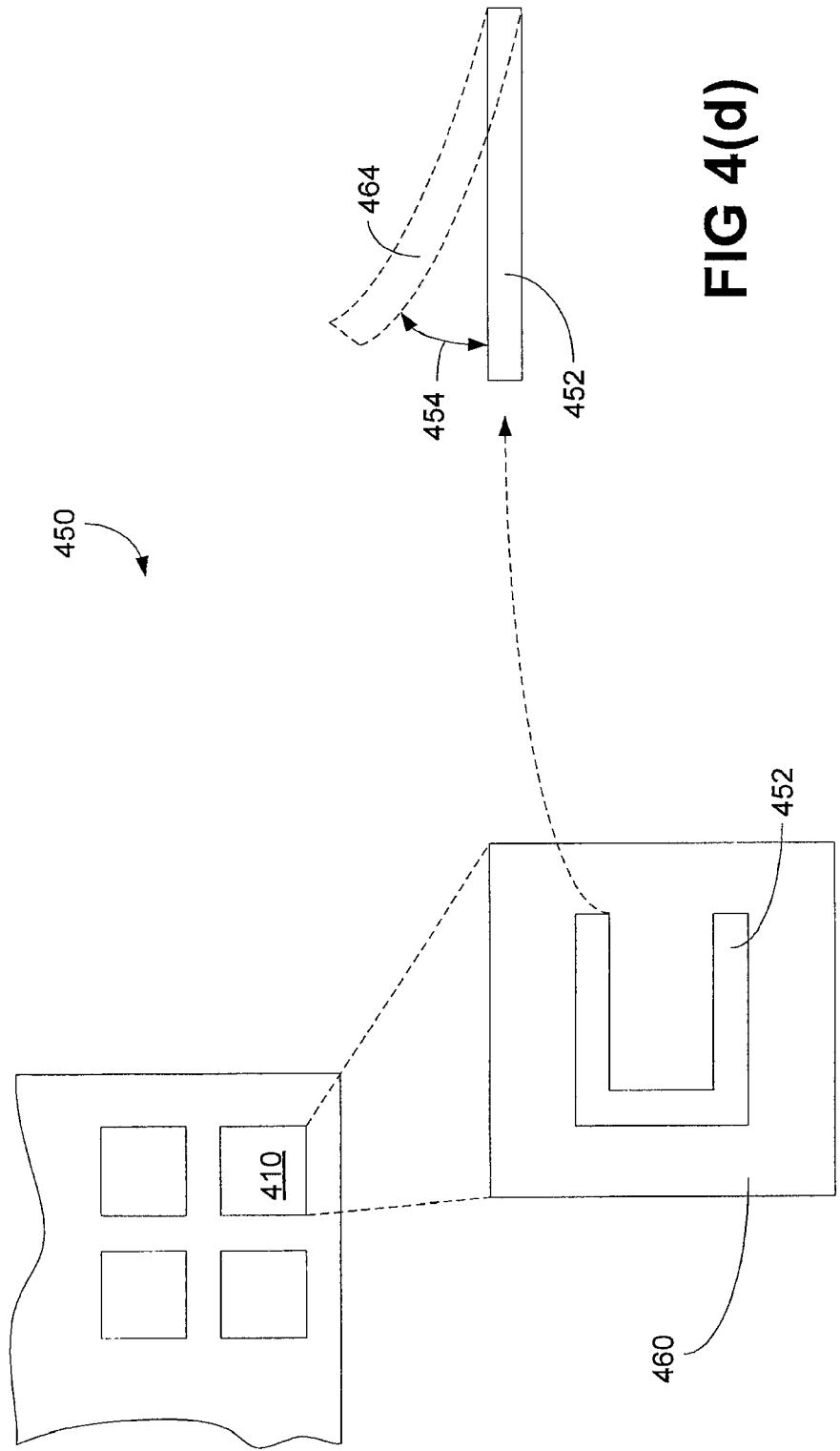

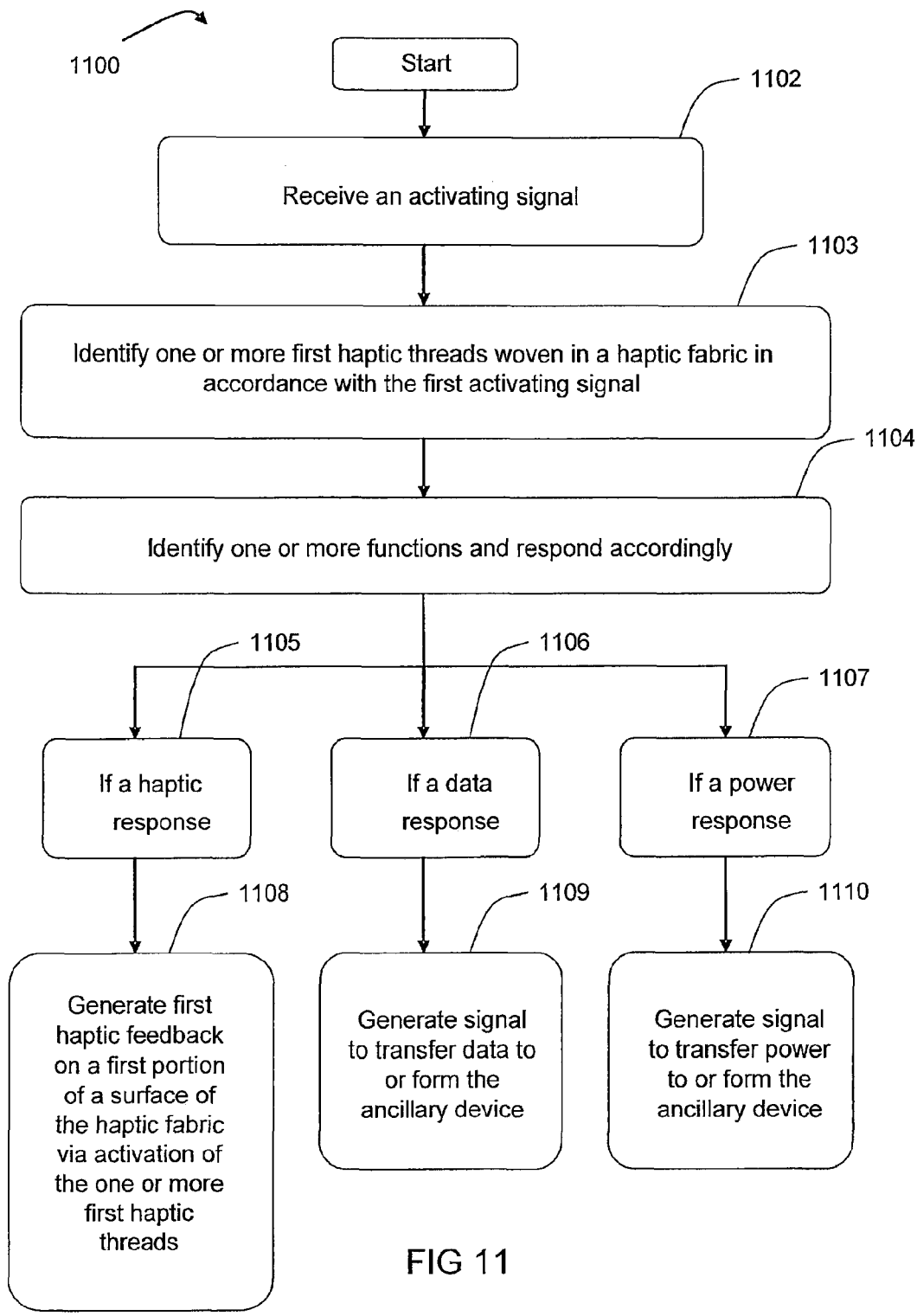

SYSTEM AND METHOD FOR PROVIDING HAPTIC FEEDBACK FROM HAPTIC TEXTILE

CROSS-REFERENCE TO RELATED APPLICATIONS

This application is a continuation application of U.S. patent application Ser. No. 12/331,728, filed Dec. 10, 2008, the entire content of which is incorporated herein by reference.

FIELD

The exemplary embodiment(s) of the present invention relates to a field of electronic interface devices. More specifically, the exemplary embodiment(s) of the present invention relates to flexible materials with haptic feedback.

BACKGROUND

As computer-based systems, such as touch panel displays, monitoring systems, training systems, game consoles, appliances, personal computers ("PCs"), servers, personal digital assistants ("PDAs"), and cellular phones become more prevalent in recent years, intuitive human-machine communications have become increasingly important. Human-machine communications generally can be categorized as relating to user interface devices and machine interface devices, wherein a user interface device provides a mechanism for a user to input commands into a machine while machine interface device is a mechanism for a machine to provide feedback to a user. Even though such computer-based systems have been involved in our daily activities, they have not commonly been integrated with clothing, garment, and/or furniture.

A problem in applying computing machine(s) to fabric and/or garments is that computer systems and their interface devices are typically bulky and awkward to carry around. For example, currently available user interface devices, such as keyboards, computer mice, joysticks, phone pads, remote controls, and/or touch screens, have various physical limitations and constraints because they are too bulky and/or too heavy to be integrated into textile and/or a garment.

SUMMARY

A method and apparatus for generating haptic feedback over a surface of a haptic textile are disclosed. The flexible textile structure includes a group of sensing circuits and haptic feedback circuits. The sensing circuits, which may include touch detectors or motion detectors, provide at least one activating signal in accordance with a sensed event. The haptic textile is structured with interlaced woven threads and/or yarns and is capable of generating haptic feedback in response to the activating signal.

Additional features and benefits of the exemplary embodiment(s) of the present invention will become apparent from the detailed description, figures and claims set forth below.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

FIGS. 4(a-d) illustrate examples of haptic cells in a haptic device employing piezoelectric materials and Micro-Electro-Mechanical Systems ("MEMS") elements in accordance with one embodiment of the present invention;

FIG. 11 is a flowchart illustrating a process of wirelessly transferring power and/or data between haptic textile and an ancillary electronic device in accordance with one embodiment of the present invention.

DETAILED DESCRIPTION

Exemplary embodiments of the present invention are described herein in the context of a method, system and apparatus for providing tactile textile.

Those of ordinary skilled in the art will realize that the following detailed description of the exemplary embodiment(s) is illustrative only and is not intended to be limiting in any way. Other embodiments will readily suggest themselves to such skilled persons having the benefit of this disclosure. Reference will now be made in detail to implementations of the exemplary embodiment(s) as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Embodiment(s) of the present invention discloses a haptic textile having sensing circuits. The sensing circuits, such as touch detectors or motion detectors, provide at least one activating signal in accordance with a sensed event. The haptic textile structured with interlaced woven threads and/or yarns is capable of generating haptic feedback in response to the activating signal. The haptic textile, for example, may include an additional protective surface layer dispersed over the textile.

Figure 1A:
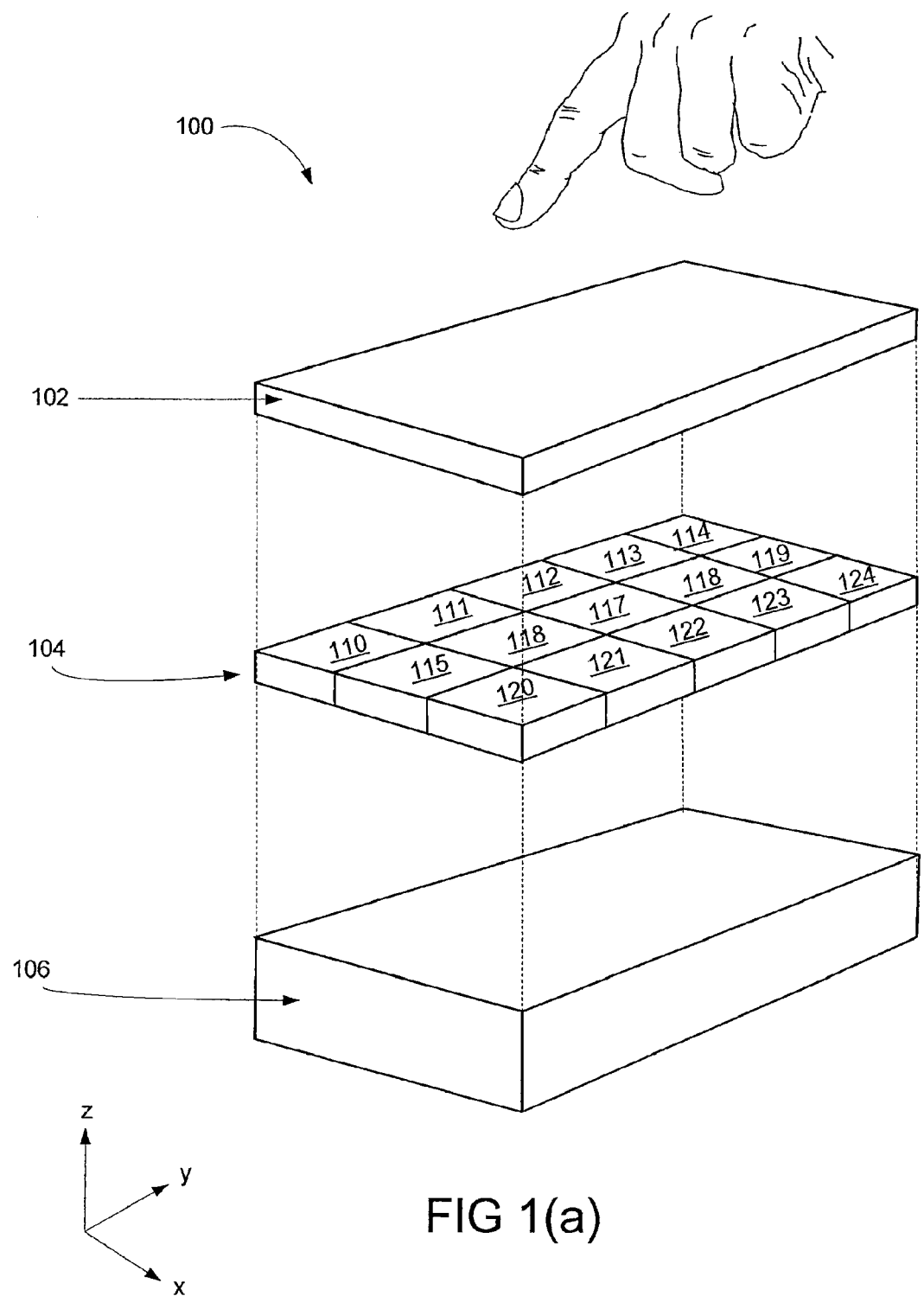
FIGS. 1(a-c) illustrate haptic devices using haptic substrates and flexible surfaces in accordance with one embodiment of the present invention.

FIG. 1(a) shows a three-dimensional (3D) diagram illustrating a haptic flexible structure 100 using a haptic substrate and a flexible surface in accordance with one embodiment of the present invention. Flexible structure 100, having a flexible surface layer 102, a haptic substrate 104, and a deforming mechanism 106, is an article of haptic textile or cloth capable of changing patterns in response to the haptic feedback. It should be further noted that the underlying concept of the exemplary embodiment of the present invention would not change if one or more blocks (circuits or layers) were added to or removed from structure 100.

Haptic substrate 104, which can also be referred to as a haptic mechanism, a haptic layer, and a tactile element, is a surface-reconfigurable haptic device capable of changing its surface features in response to one or more activating signals. Haptic substrate 104 includes multiple tactile or haptic regions 110-124, wherein each region can be independently controlled and activated. Since each tactile region can be independently activated, a specific surface pattern of haptic substrate 104 can be composed in response to the pattern activating signals. Each haptic region may be further divided into multiple haptic bits wherein each bit can be independently excited, activated, or deactivated.

Flexible surface layer 102, in one instance, is made of soft and/or elastic materials such as silicone rubber, which is also known as polysiloxane. A function of the flexible surface layer 102 is to change its surface shape or texture upon contact with the physical pattern of haptic substrate 104. Alternatively, flexible surface layer 102 is a flexible touch sensitive surface, which is capable of accepting user inputs. The flexible touch sensitive surface can be divided into multiple regions wherein each region of the flexible touch sensitive surface can accept an input when the region is being touched or depressed by a finger.

Flexible touch surface layer 102 also includes a mechanism for wireless power transfer between an ancillary electronic device and flexible structure 100. It should be noted that the wireless power transfer may or may not be haptically enabled. The implementation of wireless power transfer, for example, may include one or more of inductive coupling, evanescent coupling, resonant induction, inductive charging, adaptive induction, electrical conduction, RF transfer or the like. Similarly, flexible touch surface layer 102 may further include a wireless circuitry for data transfer between an ancillary electronic device and flexible structure 100. Wireless implementation in flexible structure 100 is further described in details in FIG. 10 and FIG. 11.

Haptic substrate 104 can be implemented by various techniques including vibration, vertical displacement, lateral displacement, push/pull technique, air/fluid pockets, local deformation of materials, resonant mechanical elements, piezoelectric materials, micro-electro-mechanical systems ("MEMS") elements, thermal fluid pockets, MEMS pumps, variable porosity membranes, laminar flow modulation, and the like. Haptic substrate 104, for example, includes one or more actuators, which can be constructed from fibers (or nanotubes) of electroactive polymers ("EAP"), piezoelectric elements, fiber of shape memory alloys ("SMAs"), and the like. EAP, also known as an artificial version of biological muscle or artificial muscles, is capable of changing its shape in response to the application of a voltage. The physical shape of an EAP may be deformed when it sustains large force. EAP may be constructed from electrostrictive polymers, dielectric elastomers, conducting polymers, ionic polymer metal composites, responsive gels, bucky gel actuators, or a combination of the above-mentioned EAP materials. Shape memory alloy ("SMA"), also known as memory metal, is another type of material that can be used to construct haptic substrate 104. SMA may be made of copper-zinc-aluminum, copper-aluminum-nickel, nickel-titanium alloys, or a combination of copper-zinc-aluminum, copper-aluminum-nickel, and/or nickel-titanium alloys. A characteristic of SMA is that after its original shape has been deformed, it can regain its original shape in response to ambient temperature and/or its surrounding environment. It should be noted that the present embodiment may combine the EAP, piezoelectric elements, and/or SMA to achieve a specific haptic effect.

Deforming mechanism 106 provides a pulling and/or pushing force to translate elements in the haptic substrate 104 causing flexible surface 102 to deform. For example, when deforming mechanism 106 creates a vacuum between flexible surface 102 and haptic substrate 104, flexible surface 102 is pushed against haptic substrate 104 causing flexible surface 102 to show the texture of flexible surface 102 in accordance with the surface pattern of haptic substrate 104.

Figure 1B:
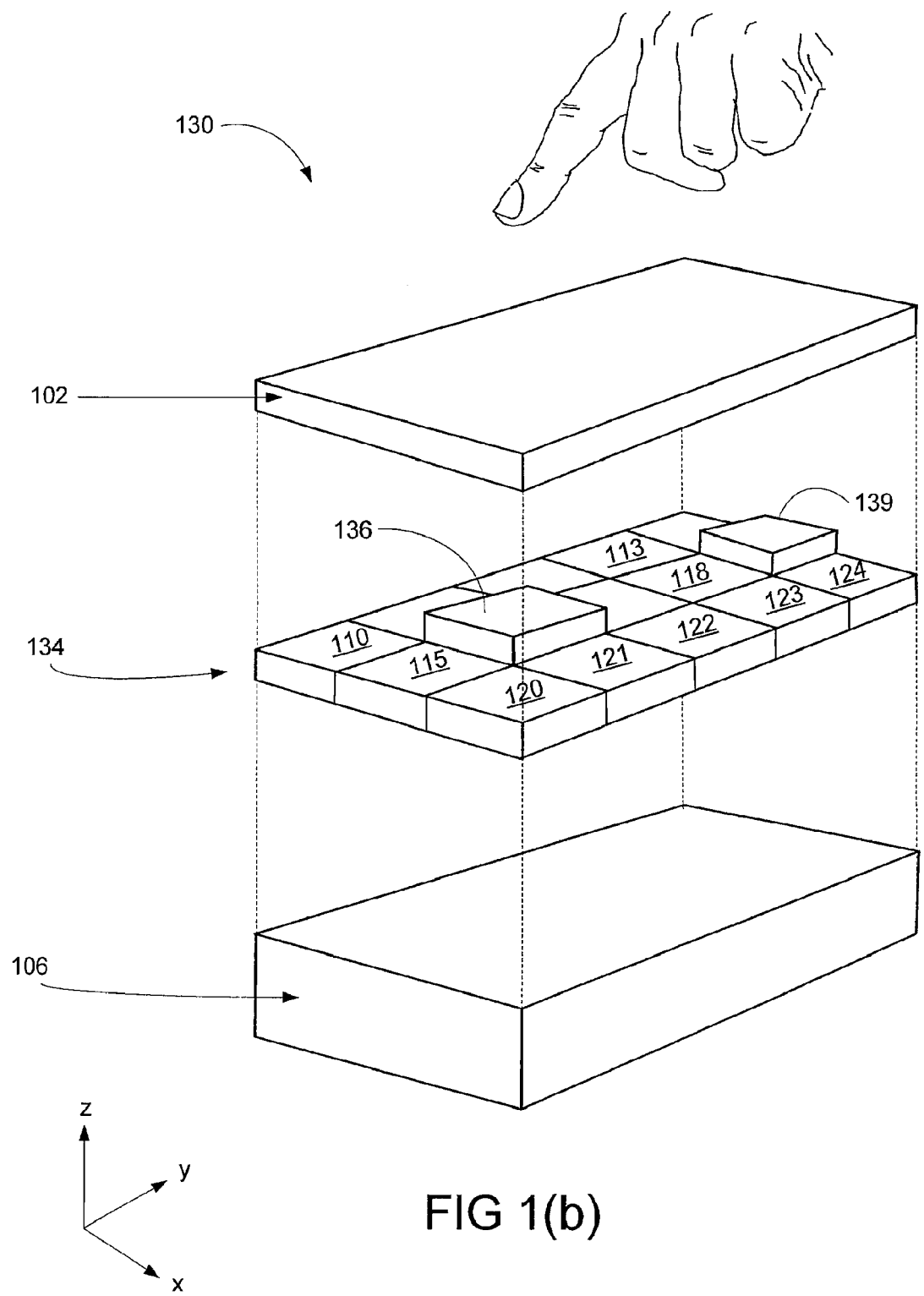

FIG. 1(b) shows a 3D diagram illustrating a haptic structure 130 using a haptic substrate and a flexible surface in accordance with one embodiment of the present invention. Haptic substrate 134 is similar to haptic substrate 104 illustrated in FIG. 1(a) except that tactile regions 136 and 139 are activated. Tactile regions 136 and 139 are raised in the z-plane. Upon receipt of one or more activating signals, haptic substrate 134 identifies a surface pattern in accordance with the activating signals. Haptic substrate 134 provides identified pattern by activating various tactile regions such as regions 136 and 139 to generate the pattern.

Figure 1C:
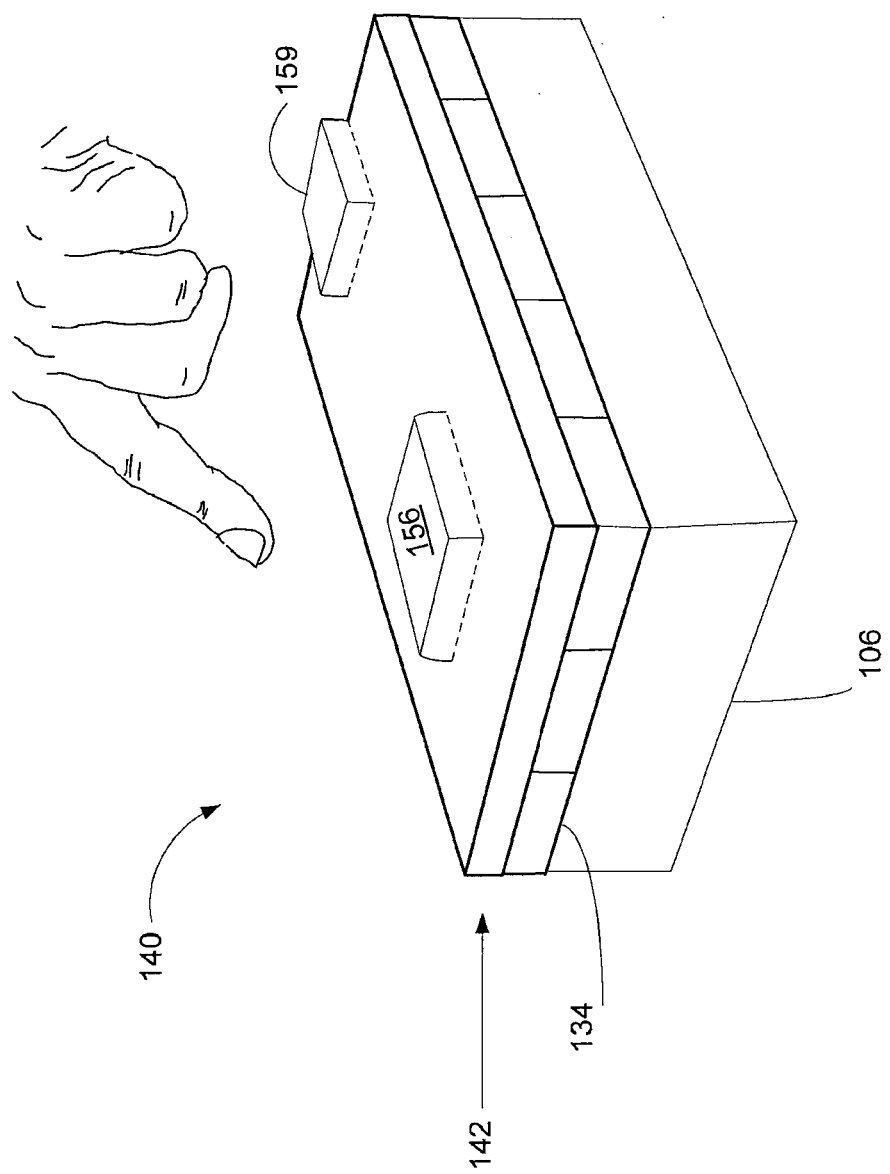

FIG. 1(c) shows a 3D diagram illustrating a haptic material or structure 140 using a haptic substrate and a flexible surface in accordance with one embodiment of the present invention. When deforming mechanism 106 is activated, flexible surface 142 collapses over haptic substrate 134, which, as illustrated in FIG. 1(b), has two activated tactile regions 136 and 139, to form two bumps 156 and 159. Bumps 156 and 159, in one example, imitate two buttons. For example, haptic substrate 134 is capable of generating one of many unique physical patterns in response to one or more signals. As such, flexible surface 102 can be reconfigured to different patterns in accordance with the pattern or patterns provided by haptic substrate 134.

Figure 2A:
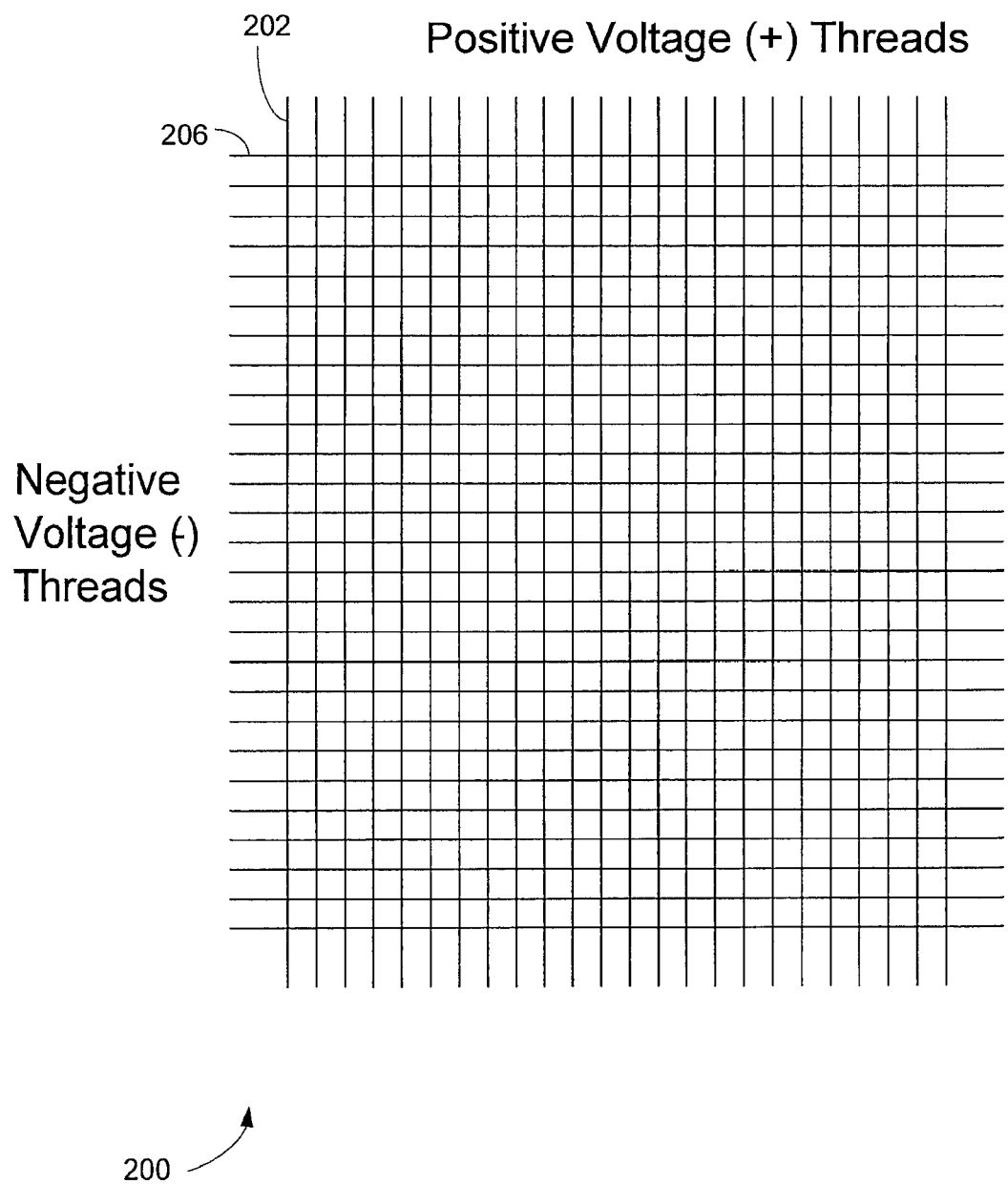
FIGS. 2(a-b) illustrate haptic textiles with haptic threads in accordance with one embodiment of the present invention.

FIG. 2(a) illustrates an article of haptic textile 200 with haptic threads in accordance with one embodiment of the present invention. Textile 200 includes threads 202 situated in a vertical direction and threads 206 situated in a horizontal direction. Threads 202 are interlaced or woven with threads 206 to form a textile. A clear protective flexible layer, for example, can be disposed over haptic textile 200 for additional protection. It should be noted that the underlying concept of the exemplary embodiment of the present invention would not change if additional layer were added to or removed from textile 200.

Textile 200 includes threads 202-206 wherein all of the threads are haptic threads. Threads 202 are configured to interweave with threads 206 to form a haptic textile wherein each of the threads 202 and/or threads 206 can be independently selected and activated. A set of multiple threads 202 and/or threads 206 can be activated together as a localized uniform haptic region. Textile 200 is structured with threads 202-206 wherein a portion of threads 202 is haptic threads and a portion of threads 206 is haptic threads. Depending on the applications, textile 200 with a portion of haptic threads and a portion of natural threads can generate similar haptic effect as it contains all haptic threads. For example, haptic yarn can be twisted with threads made of haptic materials as well as other substance. Threads made of other substance include threads made of cotton, silk, wool, synthetic materials, nylon, and so forth.

Figure 2B:
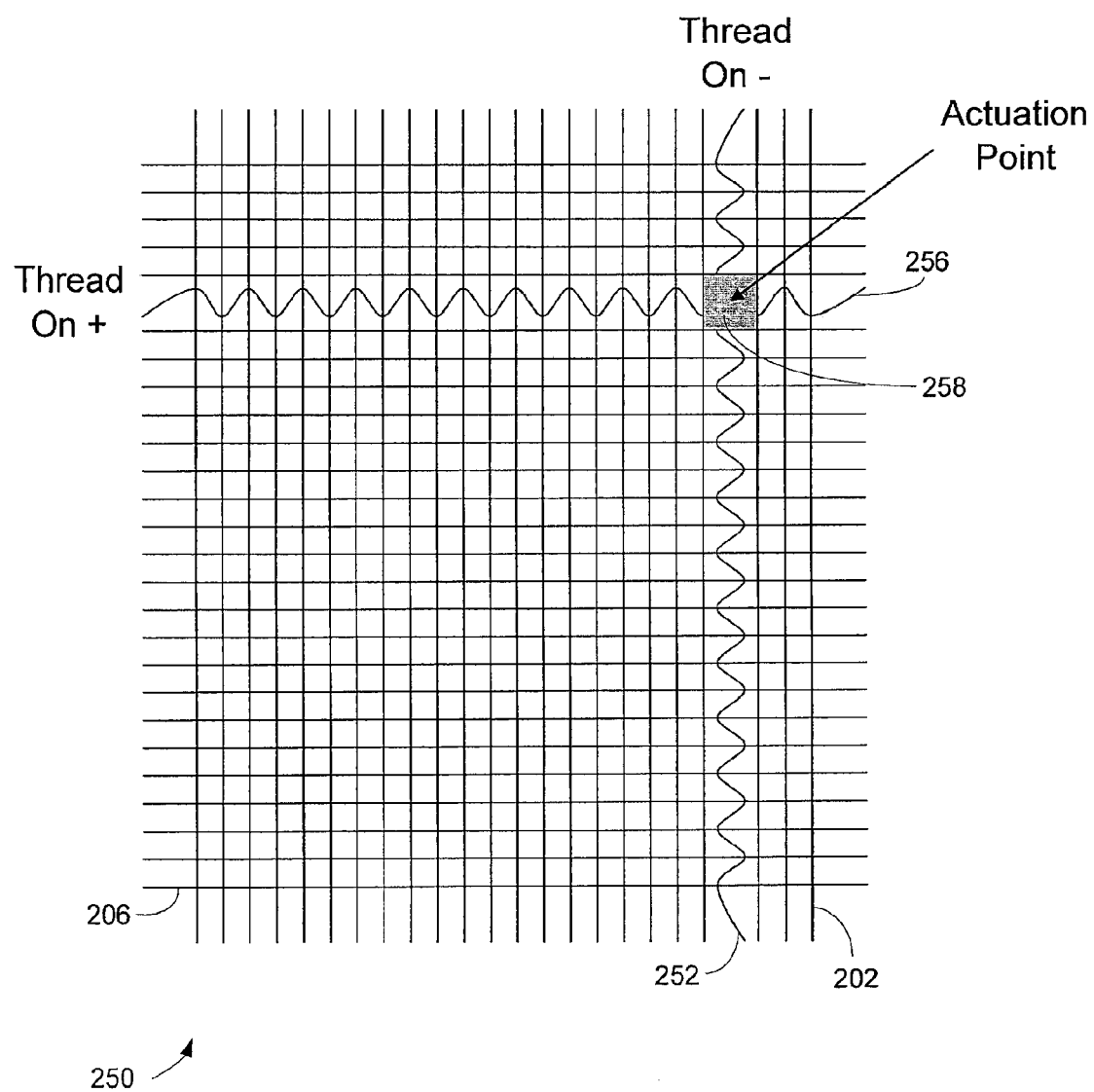

A cloth is a piece of textile or canvas, which is a woven or knitted material such as cotton or nylon. Textile 200 illustrates a thread or yarn pattern wherein threads 202 are placed in vertical direction while threads 206 are placed in horizontal direction for forming a woven textile. Threads 202, as illustrated in FIG. 2(*a*), are coupled with a positive voltage while threads 206 are coupled with a negative voltage for receiving power. Alternative weave patterns and/or structures can be used, i.e., diagonal patterns, design patterns, pictorial patterns, and the like. It should be noted that other technologies such as depositing, filming, adhering, and laminating, may be used to manufacture haptic textile or haptic cloth.

Haptic textile 200 is configured to provide multi-point haptic feedback system. For example, each of the user's fingers may feel different haptic or tactile feedback events indicating or emulating different features or events. Alternatively, a user's finger may feel a tactile feedback composed of multiple haptic signals to emulate a specific haptic event. Haptic threads or yarns are made of threads twisted with regular natural substance with haptic materials to form haptic yarns or threads. Multi-point and single-point haptic feedback can be generated by haptic thread(s) or haptic yarn(s) with or without independent actuators. For instance, upon applying a voltage, the haptic threads can vibrate or the physical dimensions of the threads may change.

Upon detecting an event, a haptic feedback effect can be generated by one or more haptic threads. The event, for example, can be a contact between a user's hand and textile 200. Another event may be a detected motion near the textile 200. Various types of haptic feedback can be generated by different types of haptic materials having a shape of a thread or a yarn. The haptic materials or substances that can be used to make threads include, but are not limited to, piezoelectric materials, MEMS elements, thermal fluid pockets, MEMS pumps, resonant devices, variable porosity membranes, laminar flow modulation, or the like.

Haptic textile 200 can be employed to various applications, such as communications, utility, dynamic real-time feedback, aesthetic patterns, and so forth. For communications, textile 200 can be used for providing information relating to alert, notification, directions, and the like. For example, when the sensing mechanism detects an air leak in a space suit, textile 200 may provide a leak alert(s) to the person (or astronaut) who wears the suit. In addition, textile 200 is also capable of notifying the astronaut how long the oxygen may last in that situation. Also, multiple haptic textiles 200 can communicate with each other via a wireless communications network. For example, a police officer may tap on a certain section of his or her own glove to signal another officer which direction he or she should take. Textile 200 can also be used with motion detectors and/or contact sensors for sensing movements and touching.

For utilities, textile 200 is capable of changing textile colors, thickness, texture, usability, and the like. For instance, textile 200 is used in the interior of a pair of glove and is capable of changing its interior surface texture to a smooth surface during wearing and subsequently changing its surface to a coarse texture for better gripping. Also, textile 200 can be used at a seat of a wheelchair wherein the surface texture of the seat changes to smooth or frictionless to facilitate sitting process and subsequently changes its surface to a coarse texture after the user sits on the seat. Textile 200 can also change its thickness in accordance with the temperature. For example, when the temperature sensor detects a low temperature, textile 200 manually or automatically changes to a heavier textile to provide thermal protection. Alternatively, if the temperature sensor senses a high temperature, textile 200 becomes a more breathable textile allowing air flow for cooling. Since the physical dimension of haptic threads can change, it can also be used for water proof clothing or breathable clothing depending on the needs.

Textile 200 is capable of providing a camouflage effect. For instance, textile 200 changes its surface texture and color in response to the texture and color of the surrounding environment. Camouflage is a method of concealing coloration to remain indiscernible from the surrounding environment through deception. As such, textile 200 can be used in soldier's uniforms, military vehicles, fighter jets, structures, ships, and the like. Upon detecting conditions of the environment, textile 200 automatically adjusts its camouflage surface to blend in with the surroundings. Textile 200 can also be used for aesthetic appearances or textures. For example, a smart clothing or furniture can change its surface patterns as well as colors. Textile 200 may glow in visible light. Aesthetic application using haptic textile can be applied to clothing, furniture, vehicles, tools, instruments, and the like. It should be noted that haptic textile 200 can change patterns locally as well as across the entire surface.

Threads 202 and 206 are interlaced to form a piece of haptic textile capable of actuating via haptic feedback generators. Varying surface textures (or vibrations) controlled by input energy can either propagate through the entire textile surface with a uniform effect or at a discrete point. It should be noted that different textures or vibrations can be generated by haptic threads at the same time across multiple points.

FIG. 2(*b*) illustrates a haptic textile 250 with haptic threads showing an exemplary localized actuation in accordance with one embodiment of the present invention. Like textile 200 shown in FIG. 2(*a*), textile 250 includes threads 202 situated in a vertical direction and threads 206 situated in a horizontal direction, wherein threads 202 is interlaced or woven with threads 206 to form a flexible textile substance. Textile 250 illustrates an intersection point 258 or an actuator point intersects between a haptic thread 252 and a haptic thread 256. Point 258, at which threads 252-256 intersect in weave, acts as an actuation point. Upon determining the type of haptic feedback, haptic feedback generators generate either vibrotactile or kinesthetic feedback to provide a localized haptic event at point 258. It should be noted that each actuation point can be independently selected and independently activated.

Figure 3D:
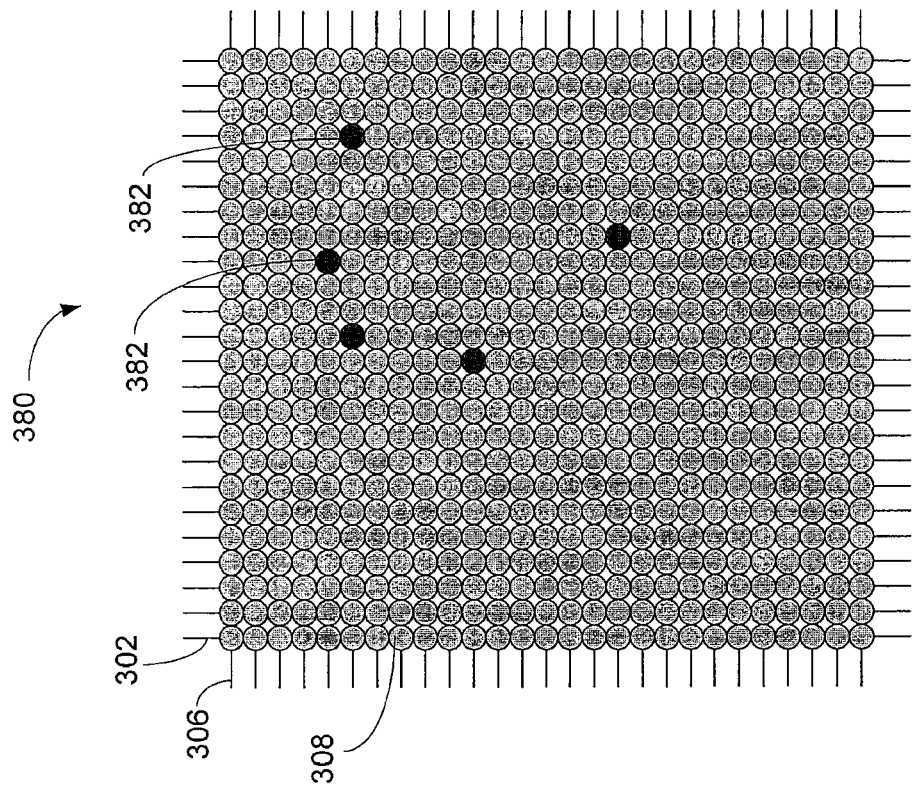
FIGS. 3(a-d) illustrate haptic textile having haptic threads and actuators in accordance with one embodiment of the present invention.
Figure 3C:
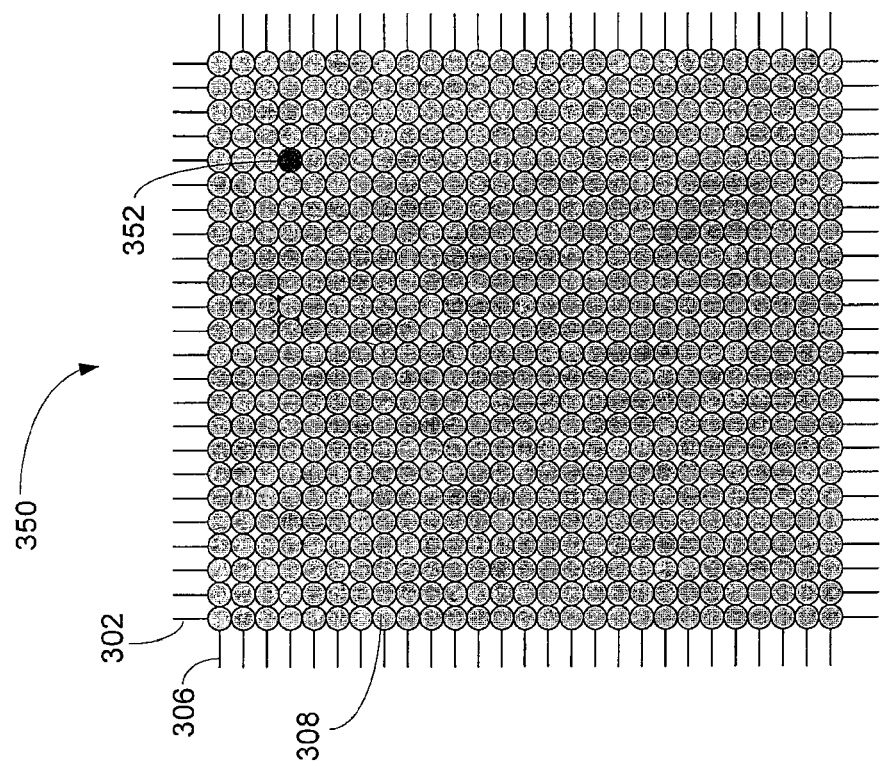

FIG. 3(*a*) illustrates a diagram 300 showing haptic textile having haptic threads and actuators in accordance with one embodiment of the present invention. Diagram 300 includes threads 302, threads 306, and an array of actuators 308. Threads 302 are situated in a vertical direction while threads 306 are situated in a horizontal direction. Threads 302 are interlaced or woven with threads 306 to form a flexible textile substance or structure. A clear protective flexible layer is disposed over haptic textile for foreign object protection. It should be noted that the underlying concept of the exemplary embodiment of the present invention would not change if additional layers are added to or removed from textile 300.

Haptic textile includes threads 302-306 wherein each intersection between threads 302 and threads 306 has an actuator 308. Actuator 308 can be independently selected and activated. Diagram 300 shows woven threads 302-306 with all actuators 308 in an off-state or deactivated state. Off-state, in one example, indicates no user interaction. Actuators 308 can be selected in a group or section or region and they are activated together. Textile 300 can also be structured with threads 302-306 wherein a portion of threads 302 is haptic threads and a portion of threads 306 is haptic threads. Depending on the applications, a flexible textile structured with a portion of haptic threads and a portion of natural threads can be just as effective as using all haptic threads.

Textile is formed by woven threads between threads 302 and threads 306. Threads 302 are connected to a positive voltage while threads 306 are connected to a negative voltage. Threads 302 and 306 are interlaced to form a haptic cloth capable of actuating a portion or the entirety of its surface 300 via haptic feedback actuators. Varying surface textures (or vibrations) controlled by input energy can either propagate to the entire textile surface with a uniform effect or at a discrete point. It should be noted that different textures or vibrations can be generated by haptic threads at the same time across multiple points.

Upon detecting an event, a haptic feedback event can be generated by one or more haptic threads 302-306 and/or actuators 308. The event, for example, can be a contact between a hand and textile 200. Various types of haptic feedback can be generated by different types of haptic materials or substances. The haptic materials or substances that can be used to make threads include, but are not limited to, piezoelectric materials, MEMS elements, thermal fluid pockets, MEMS pumps, resonant devices, variable porosity membranes, laminar flow modulation, or the like.

FIG. 3(*b*) illustrates a diagram 320 showing haptic textile having haptic threads and activated actuators in accordance with one embodiment of the present invention. Diagram 320 includes threads 302, threads 306, and an array of actuators 308, wherein at least a portion of actuators 322 are activated. Threads 302 are situated in a vertical direction while threads 306 are situated in a horizontal direction. Threads 302 is interlaced or woven with threads 306 to form a flexible textile substance or structure. Haptic textile includes threads 302-306 wherein each intersection between threads 302 and threads 306 has an actuator 308. Each actuator 308 can be independently selected and activated.

Diagram 320 shows that woven threads 302-306 wherein a portion of actuators 322 is in on-state or activated state. For example, activated actuator 322 forms a static texture pattern with diagonal strips across the entire surface of the haptic textile. Depending on the applications, a flexible textile structured with a portion of haptic threads and a portion of natural threads may be used. It should be noted that pattern can mean pattern with different color, physical dimensions, or the like.

FIG. 3(*c*) illustrates a diagram 350 showing a haptic textile having haptic threads with single activated actuators in accordance with one embodiment of the present invention. Diagram 350 includes threads 302, threads 306, and an array of actuators 308, wherein an actuator 352 is activated. Haptic textile includes threads 302-306 wherein each intersection between threads 302 and threads 306 has an actuator 308. Each actuator 308 can be independently selected and activated. Diagram 350 shows woven threads 302-306 wherein a single actuator 352 is in on-state or activated state, which indicates a single-point of interaction. For example, activated actuator 352 causes a single-point static haptic feedback effect. Alternatively, activated actuator 352 can also be interactive with touch sensors for providing dynamic real-time or substantially real-time feedback.

FIG. 3(*d*) illustrates a diagram 380 showing a haptic textile having haptic threads with multiple activated actuators in accordance with one embodiment of the present invention. Diagram 380 includes threads 302, threads 306, and an array of actuators 308, wherein five (5) actuators 382 are activated. Haptic textile includes threads 302-306 wherein each intersection between threads 302 and threads 306 has an actuator 308. Each actuator 308 can be independently selected and activated. Diagram 380 shows woven threads 302-306 wherein five actuators 382 are in on-state or activated state, which indicates a multi-point interaction. For example, activated actuator 382 causes a multi-point static haptic feedback. Alternatively, activated actuator 382 can also be interactive with touch sensors for providing dynamic real-time and/or substantially dynamic real-time feedback. It should be understood that the haptic textile can be woven into standard textiles for use as haptic clothing, furniture, or other common textile applications.

Haptic substrates, haptic actuators, and/or haptic mechanisms as described above are used to control haptic feedback for haptic textile. A combination of different haptic substrates and/or mechanisms can also be used in a haptic textile or haptic cloth to achieve the best haptic results. The following embodiments illustrated by FIG. 4 through FIG. 8 are additional examples of haptic devices or haptic actuators that can be used to generate haptic feedback for controlling surface texture as well as input confirmation of haptic textile.

FIG. 4(*a*) illustrates a tactile or haptic region 410 using piezoelectric materials to generate haptic events in accordance with one embodiment of the present invention. Region 410 includes an electrical insulated layer 402, a piezoelectric material 404, and wires 406. Electrical insulated layer 402 has a top surface and a bottom surface, wherein the top surface is configured to receive inputs. A grid or an array of piezoelectric materials 404 for example is constructed to form a piezoelectric or haptic layer, which also has a top and a bottom surface. The top surface of the piezoelectric layer is situated adjacent to the bottom surface of electrical insulated layer 402. Each region 410 includes at least one piezoelectric material 404 wherein piezoelectric material 404 is used to generate haptic events independent of other piezoelectric region 410 in piezoelectric layer. Multiple adjacent or neighboring regions 410 can be activated to generate multiple haptic events in response to multiple substantially simultaneous touches. Each region 410 is composed of a piezoelectric material, thereby enabling initiation of a unique haptic event.

It should be noted that a tactile touch panel, which includes an electrical insulated layer 402 and a piezoelectric layer, in some embodiments further includes a display, not shown in the figure. This display may be coupled to the bottom surface of the piezoelectric layer and is capable of projecting images that are viewable from the top surface of electrical insulated layer 402. It should be noted that the display can be flexible or inflexible. Piezoelectric materials 404 are substantially transparent and small. The shape of piezoelectric material 404, for example, deforms in response to electrical potentials applied via electrical wires 406.

During a manufacturing process, a piezoelectric film is printed to include an array or a grid of piezoelectric regions 410. A film of regions 410 containing piezoelectric materials can be printed on a sheet in a cell grid arrangement. The film further includes wirings for directly addressing every region 410 in the device using electrical control signals. Region 410, for example, can be activated using edge- or rear-mounted electronics. Piezoelectric materials may include crystals and/or ceramics such as quartz ($SiO_2$).

FIG. 4(*b*) illustrates a tactile or haptic region 410 generating haptic events in accordance with an embodiment of the present invention. During operation, when a voltage potential is applied to piezoelectric material 405 via wires 406, piezoelectric material 405 deforms from its original shape of piezoelectric material 404, as shown in FIG. 4(a), to expanded shape of piezoelectric material 405. Deformation of piezoelectric material 405 causes electrical insulated layer 403 to deform or strain from its original state of layer 402, as shown in FIG. 4(a). Alternatively, piezoelectric materials 405 return to its original state as soon as the voltage potential is removed. It should be noted that the underlying concept of the present invention does not change if additional blocks (circuits or mechanical devices) are added to the device illustrated in FIG. 4(a-b). If the piezoelectric material is replaced with other materials such as SMA, such material may be capable of maintaining its deformed shape for a period of time after the voltage potential is removed. It should be noted that the underlying concept of the embodiments of the present invention does not change if different materials other than piezoelectric actuators are employed. As such, a grid of actuators may be used to control the surface texture of touch-sensitive surface of the interface device.

FIG. 4(c) is a diagram 450 illustrating a tactile or haptic region or cell 410 using MEMS device 452 to generate haptic events in accordance with one embodiment of the present invention. Diagram 450 depicts a block 460, which shows a top view of cell 410. Cell 410 includes a device 452. MEMS device 452 is substantially transparent thereby the image projection from a display, not shown in FIG. 4(c), can be viewed through block 460. It should be noted that each of haptic cells 410 is coupled to at least one wire to facilitate and generate haptic events.

MEMS can be considered as an integration of mechanical devices, sensors, and electronics on a silicon or organic semiconductor substrate, which can be manufactured through conventional micro-fabrication process. For example, the electronic devices may be manufactured using semiconductor fabrication process and micromechanical devices may be fabricated using compatible micro-fabrication process. A grid or an array of MEMS devices 452 are made of multiple cantilever-springs. A grid of cantilever-springs can be etched using MEMS manufacturing techniques. Also, electrical wirings for activating or driving cantilever-springs can also be directly etched onto the surface of the MEMS device 452 thereby each MEMS device can be individually addressed. MEMS cantilevers can be used as a resonant drive (for vibrotactile feedback) or direct actuation (for kinesthetic feedback).

FIG. 4(d) illustrates a side view of MEMS device 452, wherein MEMS device 462 can be stimulated or deformed from its original state of MEMS device 452 to deformed state of MEMS device 464 when a voltage potential across MEMS device is applied. Displacement 454 between the original state and the deformed state depends on the composition of materials used and the size of MEMS device 452. Although smaller MEMS devices 452 are easier to fabricate, they offer smaller displacement 454. Cantilever-springs can be made of piezo materials. It should be further noted that piezo material can be used as a sensor for sensing fingertip positions and depressions.

MEMS device 452 uses SMA in place of cantilever-spring as described above. The actuation generated by SMA device 452 using SMA provides kinesthetic feedback. After deforming from SMA's original shape, SMA may regain its original shape in accordance with an ambient temperature and/or surrounding environment. It should be noted that the present invention may combine piezoelectric elements, cantilever-springs, and/or SMA to achieve a specific haptic effect. As such, a grid of MEMS device 452 may be used to control the surface texture of touch-sensitive surface of the interface device.

Figure 5A:
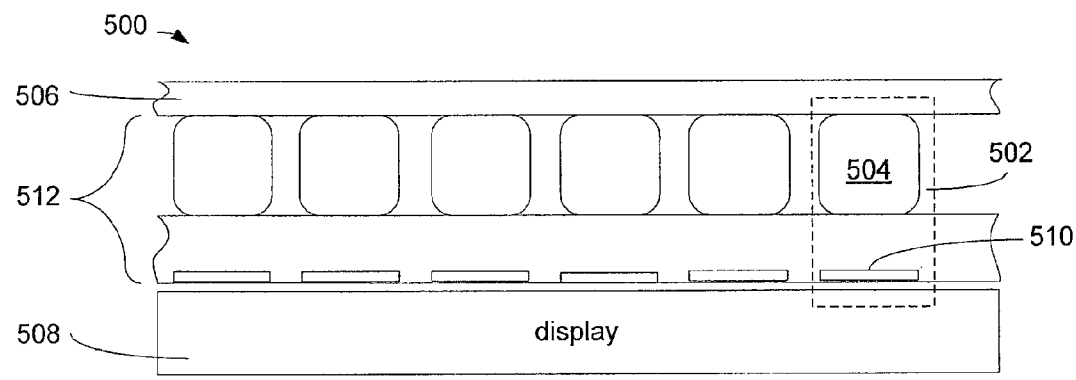
FIG. 5(a-b) illustrates a side view of a haptic device having an array of haptic cells with thermal fluid pockets in accordance with one embodiment of the present invention.

FIG. 5(a) is a side view diagram of an interface device 500 illustrating an array of haptic cells or tactile region 502 with thermal fluid pockets 504 in accordance with one embodiment of the present invention. Device 500 includes an insulated layer 506, a haptic layer 512, and a display 508. While the top surface of insulated layer 506 is capable of receiving inputs from a user, the bottom surface of insulated layer 506 is placed adjacent to the top surface of haptic layer 512. The bottom surface of haptic layer 512 is placed adjacent to display 508, wherein haptic layer 512 and insulated layer 506 may be substantially transparent thereby objects or images displayed in display 508 can be seen through haptic layer 512 and insulated layer 506. It should be noted that display 508 is not a necessary component in order for the interface device to function.

Haptic layer 512 includes a grid of fluid filled cells 502, which further includes at least one thermal fluid pocket 504 and an associated activating cell 510. It should be noted that each of fluid filled cells 502 can include multiple thermal fluid pockets 504 and associated activating cells 510. A fluid filled cell 502 can include multiple activating cells, whereby a different combination of activation of the activating cells generates different haptic event.

Activating cell 510 is a heating element, which is capable of heating an associated thermal fluid pocket 504. Various electrical, optical, and mechanical techniques relating to heating technology can be used to fabricate activating cells 510. For example, various electrically controlled resistors can be used for activating cells 510, wherein resistors can be implanted in haptic layer 512 during the fabrication. Alternatively, optical stimulators such as infrared lasers can be used as activating cells 510 to heat thermal fluid pockets 504. Optical stimulator, for example, can be mounted at the edge of the interface device. It should be noted that activating cells 510 can be any type of optical or radioactive actuator as long as it can perform the function of heating the fluid pocket.

Device 500 further includes a set of control wires, not shown in FIG. 5(a), wherein each of activating cells 510 is coupled to at least one pair of wires. The wires are configured to transmit activating/deactivating control signals, which are used to drive activating cells 510. It should be noted that each of fluid filled cells 502 is addressable using signals from wires or wireless networks. Display 508 can be a flat panel display or a flexible display. The physical location of display 508 is exchangeable with haptic layer 512. Also, thermal fluid pockets 504 can be activated by a piezoelectric grid.

Thermal fluid pockets 504 include fluid with physical properties of low specific heat and high thermal expansion. Examples of this fluid include glycerin, ethyl alcohol, and the like. Thermal fluid pockets 504 are capable of producing multiple localized strains in response to multiple contacts detected by insulated layer 506. Each localized strain is created by a heated thermal fluid pocket 504 wherein the heat is generated by an associated activating cell 510. A thermal fluid pocket 504 can change its physical shape in accordance with the temperature of the fluid in the pocket. Alternatively, fluid-filled cell 502 has an active cooling system, which is used to restore the expanded shape of thermal fluid pocket 504 to its original shape after it is deactivated. The control of fluid temperature affects haptic bandwidth. The speed of rising and falling of fluid temperature affects the speed of successive haptic events.

The physical size of each fluid cell 502 can also affect the performance of the cell for generating haptic events. For example, if the size of fluid cell 504 is smaller than a half finger, the performance of cell 504 can be enhanced because smaller cell permits rapid heat dissipation as well as quick temperature rising of fluid in the cell. The thermal plastic pockets filled with plastic fluid are used in place of thermal fluid pockets 504 filled with thermally-reactive fluid to enhance the haptic events. Using thermal plastic pockets filled with plastic-like fluid, e.g., polyethylene, can produce high thermal plastic strain. Thermal plastic pockets can also provide different and unique haptic events to the user. Some exotic fluids such as electrorheological and/or magnetorheological fluid can be used in place of thermal fluid in thermal fluid pockets 504. Thermal fluid pockets 504 filled with electrorheological fluid can be stimulated by a local or remote electrical field, while thermal fluid pockets 504 filled with magnetorheological fluid can be stimulated by a local or remote magnetic field.

Figure 5B:
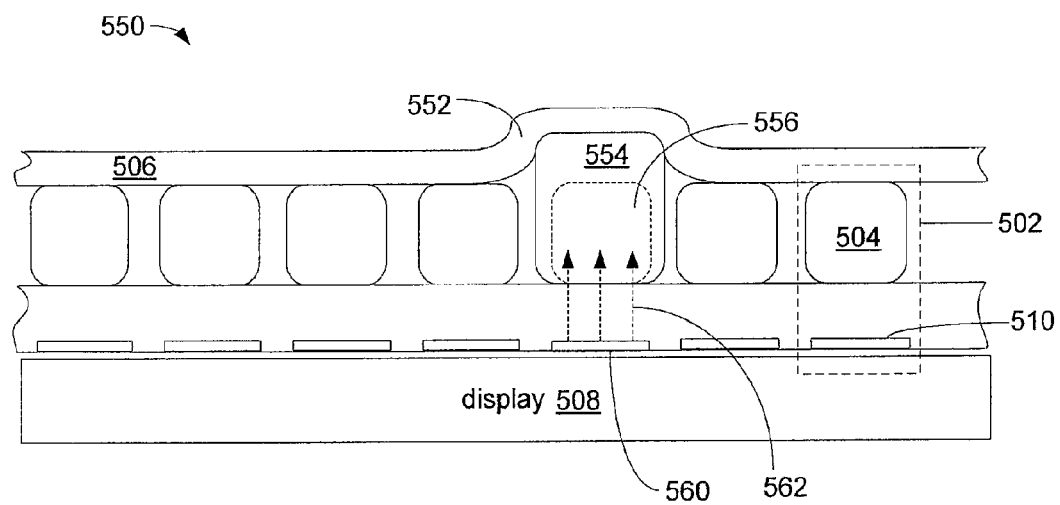

FIG. 5(*b*) is a side view diagram for an interface device 550 illustrating an array of haptic cells 502 using thermal fluid pockets 554 in accordance with one embodiment of the present invention. Device 550 also shows an activated thermal fluid pocket 554 and an activated activating cell 560. During the operation, thermal fluid pocket 554 increases its physical volume (or size) from its original state 556 to expanded thermal fluid pocket 554 when activating cell 560 is activated. When activating cell 560 is activated, it provides heat 562 to thermal fluid pocket 554 or 556 to expand the size of thermal fluid pocket 554 or 556. Due to the expansion of thermal fluid pocket 554, a localized portion 552 of insulated layer 506 is created. As soon as the temperature of the fluid in the thermal fluid pocket 554 cools down, the size of thermal fluid pocket 554 returns to its original state 556. The change in size between the original size of a thermal fluid pocket 556 and the expanded size of thermal fluid pocket 554 generates a haptic effect. It should be noted that activating cell 560 could be an electric heating element or an optical heating element such as an infrared-sensitive actuation system. As such, an array of haptic cells using thermal fluid pockets 552 may be used to control the surface texture of the touch-sensitive surface of the device.

Figure 6:
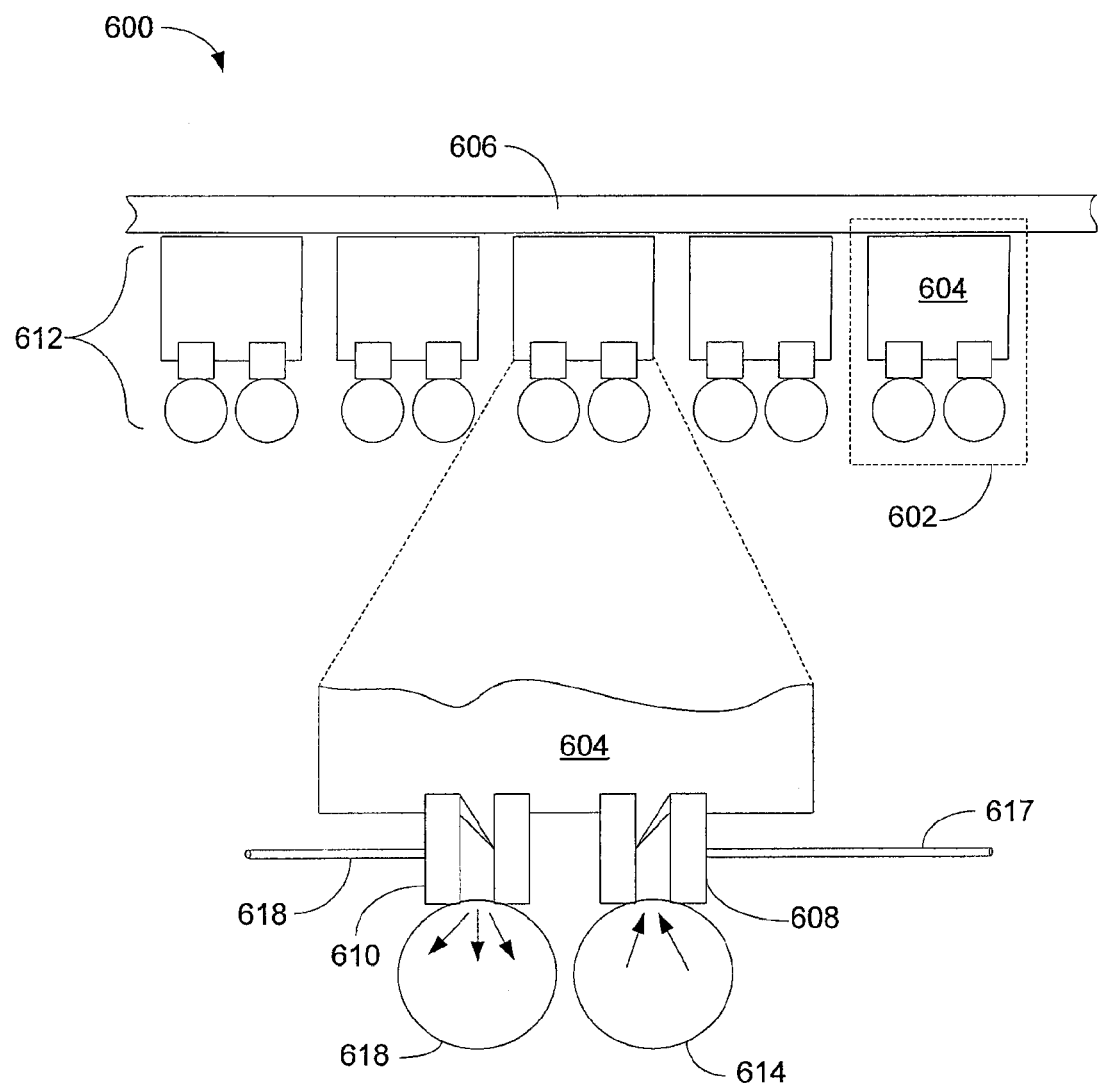
FIG. 6(a-b) illustrates a haptic cell employing MEMS pumps to generate haptic events in accordance with one embodiment of the present invention.
Figure 6B:
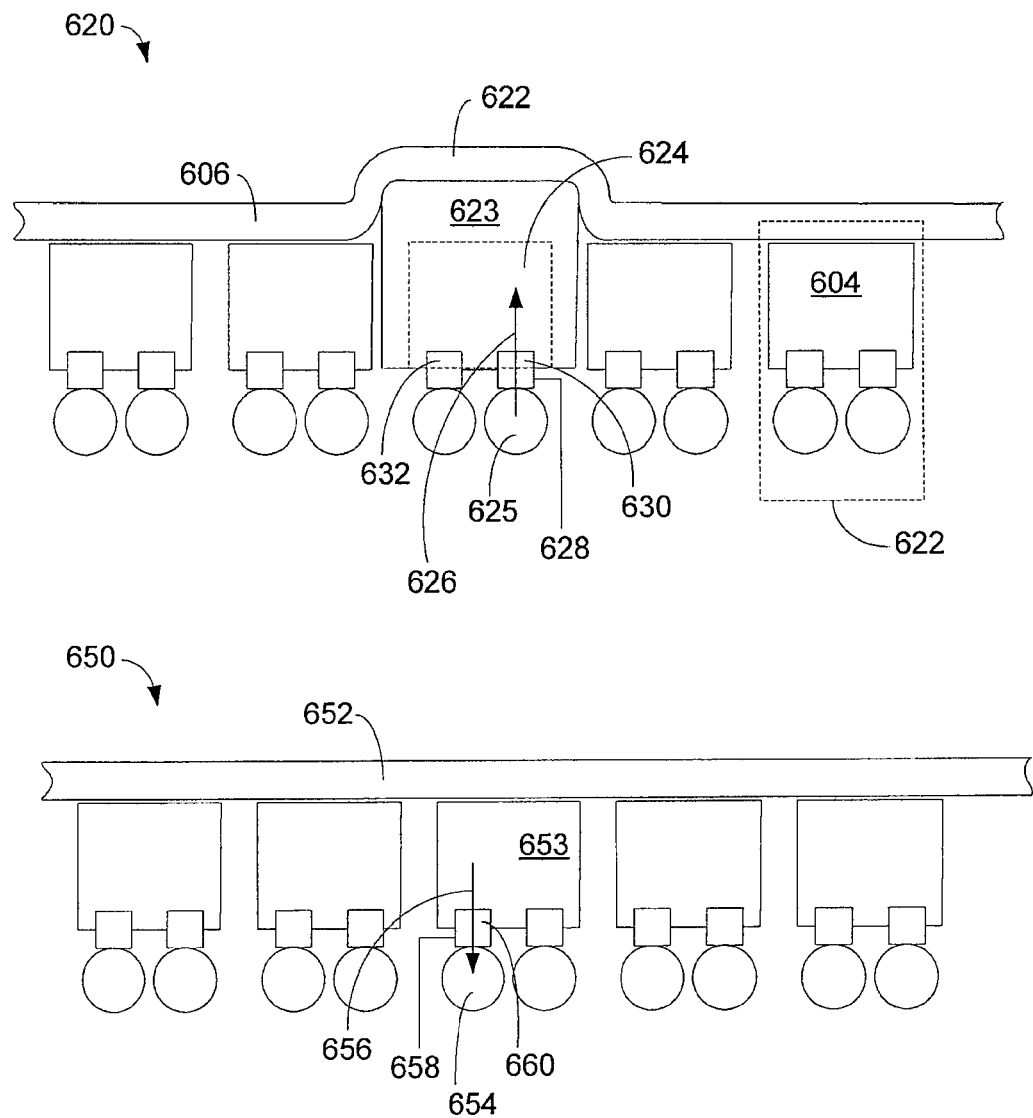

FIG. 6(*a*) is a side view diagram of an interface device 600 illustrating an array of MEMS pumps 602 in accordance with one embodiment of the present invention. The array of MEMS pumps 602 can be used to implement tactile regions for controlling surface textures. Diagram 600 includes an insulated layer 606 and a haptic layer 612. While the top surface of insulated layer 606 is configured to accept a touch or touches from a user, the bottom surface of insulated layer 606 is placed adjacent to the top surface of haptic layer 612. The bottom surface of haptic layer 612 can be placed adjacent to a display (not shown in FIG. 6(*a*)), wherein haptic layer 612 and insulated layer 606 may be substantially transparent thereby objects or images displayed in the display can be seen through haptic layer 612 and insulated layer 606. It should be noted that display is not a necessary component in order for the interface device to function.

Haptic layer 612 includes a grid of MEMS pumps 602, which further includes at least one pocket 604. Each MEMS pump 602 includes a pressurized valve 608 and a depressurized valve 610. Pressurized valve 608 is coupled to an inlet tube 614 while depressurized valve 610 is coupled to an outlet tube 616. Inlet tube 614, which is under high liquid pressure, is used to pump liquid through pressurized valve 608 to expand pocket 604. Similarly, outlet tube 616, which is under low pressure, is used to release the liquid through depressurized valve 610 to release the pressure from pocket 604. It should be noted that MEMS pumps 602 can be coupled to the same pressurized liquid reservoir. It should be further noted that pressurized valve 608 and depressurized valve 610 can be combined into one single valve for both inlet tube 614 and outlet tube 616. It should be further noted that inlet tube 614 and outlet tube 616 can also be combined into one tube.

A grid of MEMS pumps 602 includes an array of pressurized valves 608 and depressurized valves 610, wherein pressurized valves 608 are coupled with a rear or a side mounted liquid reservoir under pressure while depressurized valves 610 are coupled to a rear or a side mounted depressurized liquid reservoir with low pressure. Valves 608-610 control the filling and emptying the liquid pockets 604 in MEMS pumps 602 to produce a localized strain. An advantage of using pressurized liquid reservoir is to quickly deform the surface of insulated layer 606 and to maintain the deformation with minimal or no energy consumption (or expenditure). It should be noted that MEMS pump 602 can also use pressurized air or other gases to achieve similar results as liquid.

Device 600 further includes a set of control wires 617-618, which can be used to control pressurized valve 608 and depressurized valve 610, respectively. It should be noted that each valve in haptic layer 612 is addressable using electrical signals transmitted via wires or a wireless network.

FIG. 6(*b*) illustrates two diagrams of an interface device 620 and 650 having an array of MEMS pumps 604 in accordance with one embodiment of the present invention. Device 620 illustrates an activated pocket 623, which includes an activated inlet valve 630 and a deactivated outlet valve 632. During an operation, pocket 623 increases its physical volume (or size) from its original state 624 to its expanded pocket 623 when inlet valve 630 is activated. When inlet valve 630 is activated (or opened) in response to electrical signal from wire 628, inlet tube 625 pumps liquid 626 from pressurized reservoir to pocket 623. Due to the expansion of pocket 623, a localized strain 622 of insulated layer 606 is created.

Device 650 illustrates an activated MEMS pump returns from its expanded state of pocket 623 to the original state of pocket 653. When depressurized valve 660 is activated, depressurized valve 660 releases liquid 656 from pocket 653 to low pressurized outlet 654. It should be noted that depressurized valve 660 is controlled by at least one control signal via wire 658. The change in volume between the original size of pocket 604 and the expanded size of pocket 623 generates haptic events. As such, an array of MEMS pumps 602 may be used to control the surface texture of touch-sensitive surface of the interface device.

Figure 7:
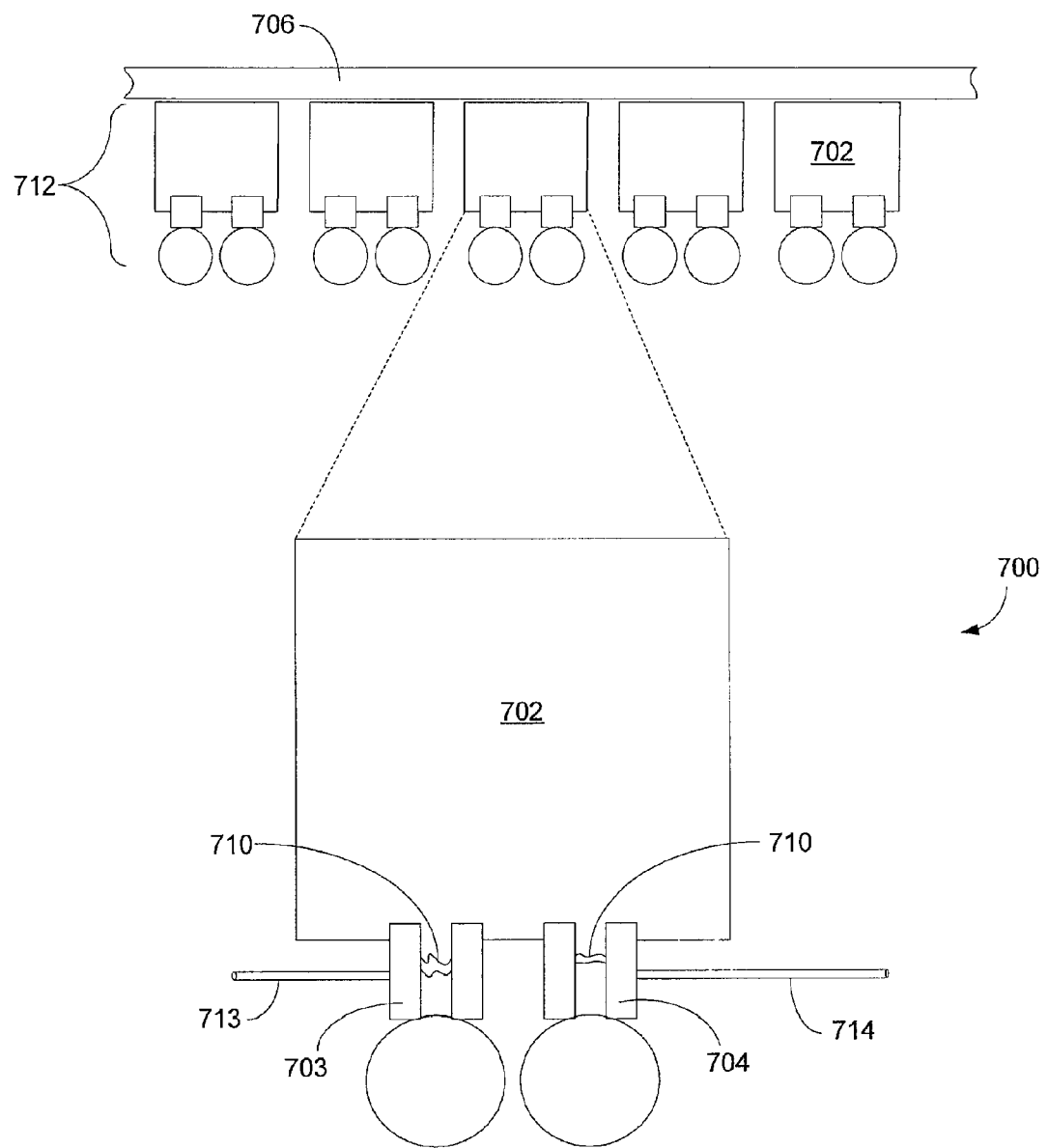
FIG. 7 illustrates a side view diagram for a haptic device having an array of haptic cells using variable porosity membrane in accordance with one embodiment of the present invention.

FIG. 7 illustrates a side view diagram for an interface device 700 having an array of haptic cells 702 using variable porosity membrane 710 in accordance with one embodiment of the present invention. The porosity membrane 710 can be used to implement regions for controlling surface textures. Device 700 includes an insulated layer 706 and a haptic layer 712. While the top surface of insulated layer 706 is configured to receive inputs from a user, the bottom surface of insulated layer 706 is placed adjacent to the top surface of haptic layer 712. The bottom surface of haptic layer 712 is placed above to a display (not shown in FIG. 7), wherein haptic layer 712 and insulated layer 706 are transparent or semi-transparent whereby images displayed in the display can be seen through haptic layer 712 and insulated layer 706. It should be noted that a display is not a necessary component in order for the interface device to function.

Haptic layer 712 includes a grid of haptic cells 702, inlet valves 703, and outlet valves 704. Haptic cells 702 are pockets capable of containing fluid. Haptic layer 712 is similar to haptic layer 612 as shown in FIG. 6(*a*) except that haptic layer 712 employs porosity membranes. While each inlet valve 703 is controlled by control signal(s) transmitted by wire 713, each outlet valve 704 is controlled by electrical signals transmitted over a wire 714. Every inlet valve 703 or outlet valve 704 employs at least one porosity membrane 710. Porosity membranes 710 are coupled (or faced) to a liquid reservoir wherein each membrane 710 is configured to control how much liquid should enter and/or pass through membrane 710. An advantage of using porosity membranes is to maintain the deformation of insulated layer 706 with minimal or no energy consumption. As such, a grid of haptic cells using variable porosity membrane 710 may be used to control the surface texture of touch-sensitive surface of the device.

Figure 8:
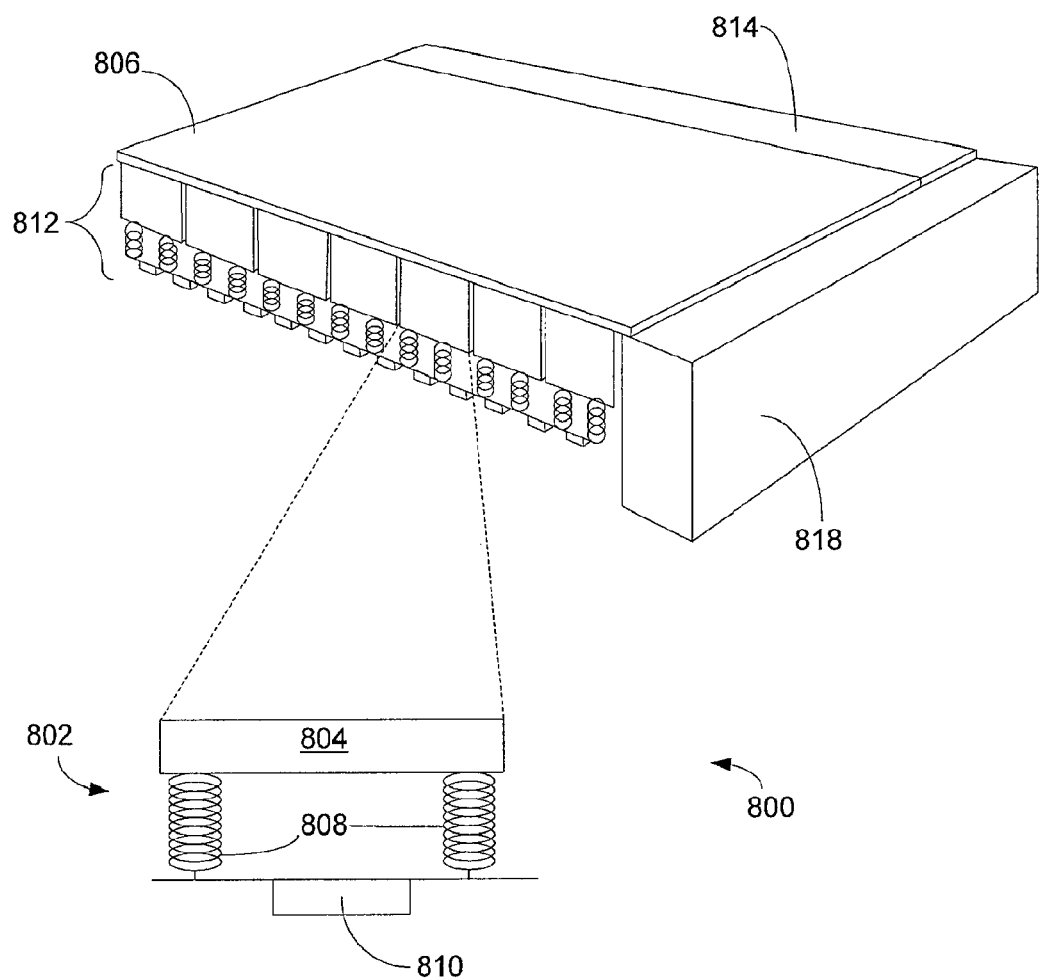
FIG. 8 is a side view of a haptic device having an array of haptic cells using various resonant devices in accordance with one embodiment of the present invention.

FIG. 8 is a side view of a device 800 having an array of haptic cells 802 using various resonant devices in accordance with one embodiment of the present invention. The array of haptic cells 802 can be used to implement tactile regions for controlling surface textures. Device 800 includes an insulated layer 806 and a haptic layer 812. While the top surface of insulated layer 806 is configured to receive an input from a user, the bottom surface of insulated layer 806 is placed adjacent to the top surface of haptic layer 812. The bottom surface of haptic layer 812 can be placed adjacent to a display (not shown in FIG. 8), wherein haptic layer 812 and insulated layer 806 may be substantially transparent thereby objects or images displayed in the display can be seen through haptic layer 812 and insulated layer 806. It should be noted that insulated layer 806 may be flexible whereby it is capable of providing desirable relief information on its surface.

Haptic layer 812 includes a grid of haptic cells 802, wherein each cell 802 further includes a permanent magnet 804, an electro magnet 810, and two springs 808. Haptic layer 812 is similar to haptic layer 612 shown in FIG. 6(a) except that haptic layer 812 employs resonant devices while haptic layer 612 uses MEMS pumps. Haptic cell 802 uses a resonant mechanical retractable device to generate haptic events. The resonant mechanical retractable device vibrates in response to a specific frequency, which could be generated by a side-mounted resonant stimulator 816 or a rear-mounted resonant stimulator 814. A resonant grid can be used to form a haptic layer 812. Each cell 802 is constructed using resonant mechanical elements such as linear resonant actuator or MEMS springs. Each cell 802, however, is configured to have a slightly different resonant frequency and a high Q (high amplification at resonance and a narrow resonant frequency band). As such, each cell 802 can be stimulated using mechanical pressure waves originating at the edges of the sheet. The haptic events can also be generated by a piezoelectric or other high bandwidth actuator.

Cell 802 can also include one spring 808. In addition, cell 802 can further include more than two springs 808. Each spring 808 is configured to respond to a specific range of frequencies, thereby each spring 808 can produce a specific haptic event. As such, a grid of haptic cells using various resonant devices may be used to control the surface texture of touch-sensitive surface of the interface device. For example, if the displacement of haptic mechanism is sufficiently high, e.g., greater than 200 micrometers, the oscillation (or vibrotactile effect) at low frequencies, e.g., 50 Hz or less, might be sufficient to provide desirable relief information.

The exemplary embodiment(s) of the present invention includes various processing steps which will be described below. The steps of the embodiments may be embodied in machine- or computer-executable instructions. The instructions can be used to cause a general purpose or special purpose system or controller, which is programmed with the instructions, to perform the steps of the embodiment(s) of the present invention.

Figure 9:
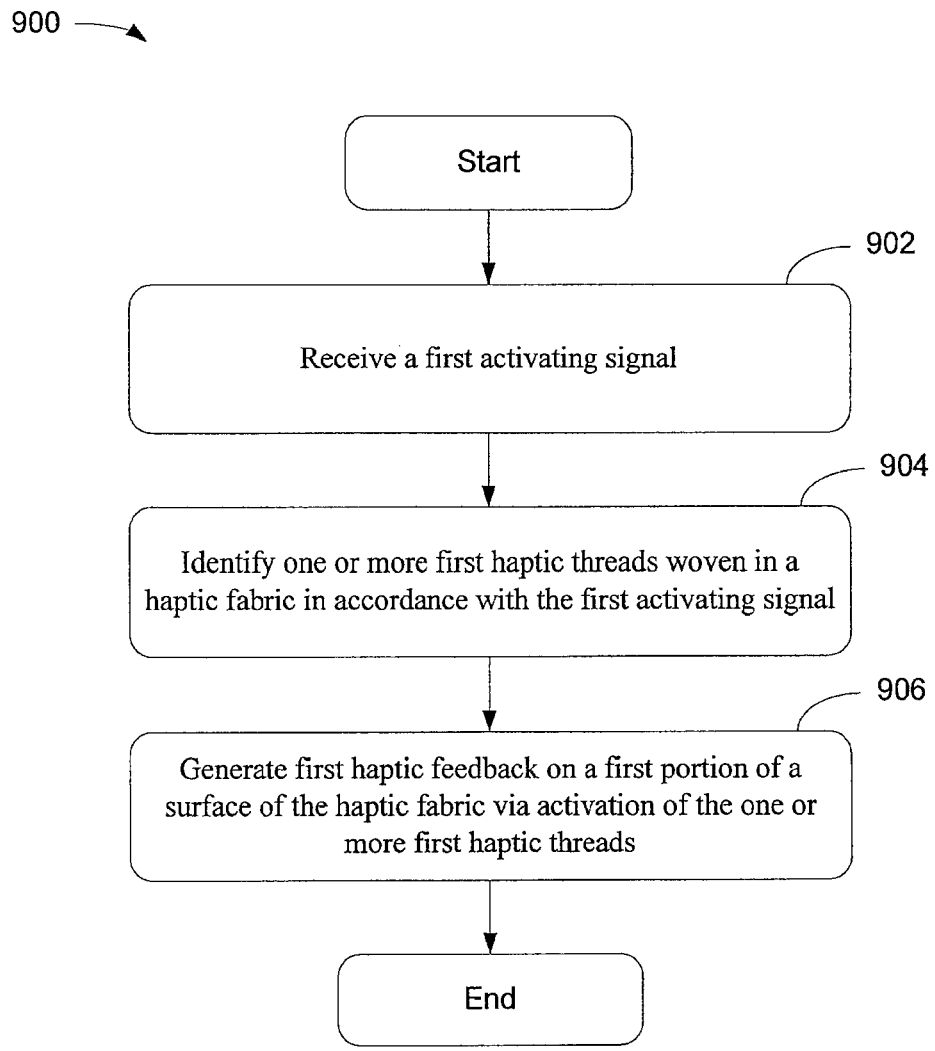
FIG. 9 is a flowchart illustrating a process of providing haptic feedback on a haptic textile in accordance with one embodiment of the present invention.

FIG. 9 is a flowchart 900 illustrating a process of providing haptic feedback on haptic textile in accordance with one embodiment of the present invention. At block 902, a process for providing textile haptic feedback receives a first activating signal. In one embodiment, upon calibrating sensors in accordance with a predefined parameter, the process monitors the surrounding environment in accordance with the predefined parameter. In one embodiment, a user can calibrate the predefined parameter(s) to indicate which event(s) should be detected. After sensing an event associating to the haptic textile, the process generates the first activating signal in response to the event. In one embodiment, the process can issue a haptic signal in response to a contact detection by the haptic textile. In an alternative application, the process can be used to issue an alert haptic signal in response to a motion detected by the haptic textile.

At block 904, the process identifies one or more haptic threads woven in a haptic textile in accordance with the first activating signal. The process is further capable of determining a haptic texture pattern on the surface of haptic textile in accordance with the first activating signal.

At block 906, the process generates a first haptic feedback on a first portion of a surface of the haptic textile via activation of the one or more first haptic threads in response to the first activating signal. Upon receiving a second activating signal, the process identifies one or more second haptic threads woven in a haptic textile in accordance with the second activating signal. The process subsequently generates a second haptic feedback on a second portion of the surface of the haptic textile via activation of the one or more second haptic threads in response to the second activating signal. The process is further capable of reconfiguring at least a portion of surface texture of the haptic textile changing from a first surface characterization to a second surface characterization in accordance with the first activating signal.

Figure 10:
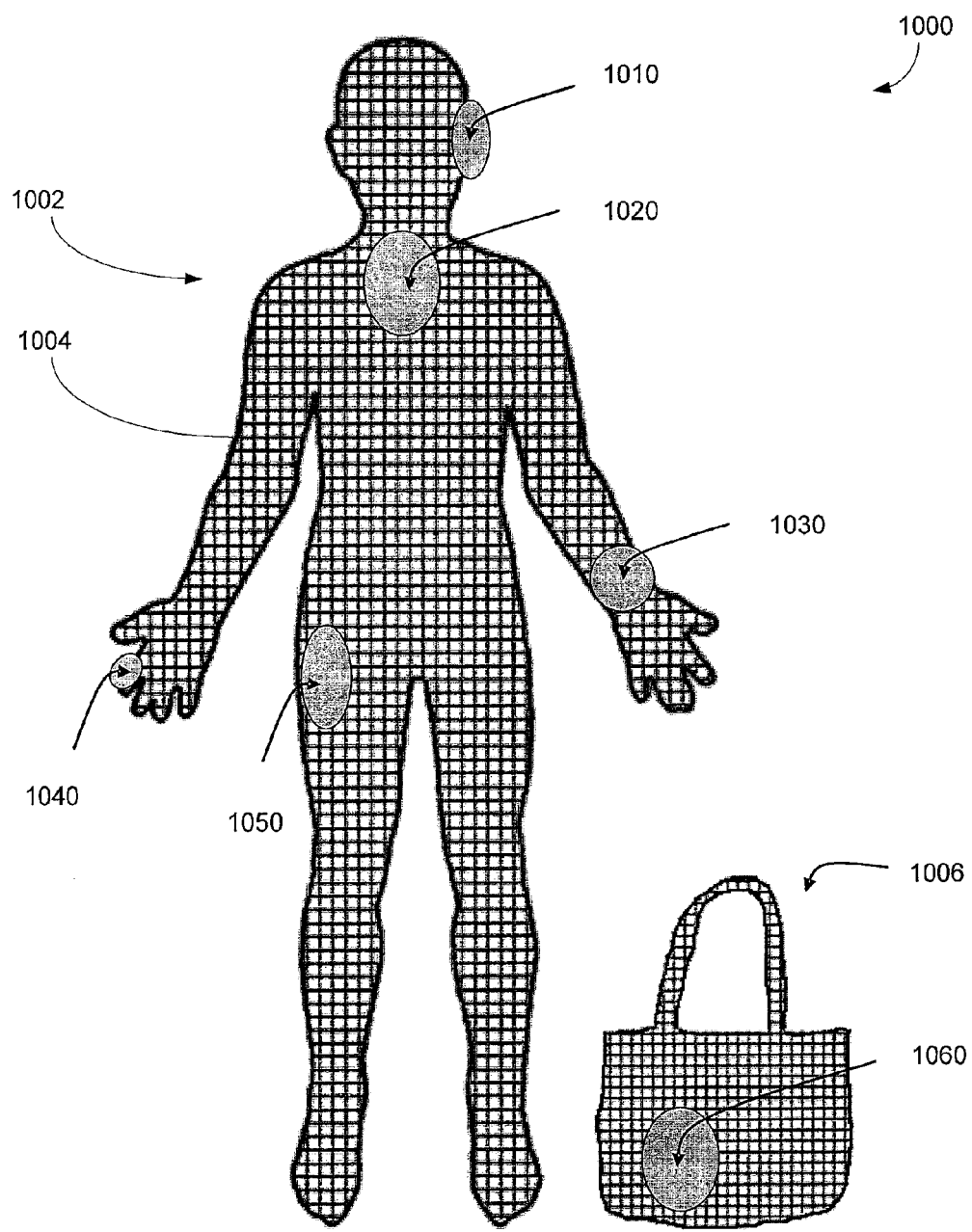
FIG. 10 is a diagram illustrating an article of haptic textile configured in a garment capable of accepting wireless power transfer in accordance with one embodiment of the present invention.

FIG. 10 is a diagram 1000 illustrating an article of haptic textile configured in a garment capable of accepting wireless power transfer in accordance with one embodiment of the present invention. Diagram 1000 includes a person 1002, an article of haptic textile 1004, a handbag 1006, and multiple exemplary ancillary electronic devices. Person 1002 is wearing a garment fabricated with haptic textile 1004. Alternatively, only a portion of the garment is made with haptic textile 1004. It should be noted that the underlying concept of the exemplary embodiment of the present invention would not change if additional devices were added to or removed from diagram 1000.

The ancillary electronic device, for example, may be used to supply power to haptic textile 1004 via a wireless and/or conductive contact-based power transfer. Alternatively, the ancillary electronic device may exchange data signals with haptic textile 1004 via a wireless and/or conductive contact-based communications bus. The conductive contact may include micro-contacting points (or bumps), and it may provide power or information to haptic textile 1004 when it comes into contact with the haptic textile 1004. The wireless communications network, for example, may employ one of various types of communication protocols, such as 802.11* WLAN, cellular (GPRS, CDMA, GSM, CDPD, 2.5G, 3G, etc), Bluetooth, Ultra-WideBand (UWB), WiMax, Zigbee, Ambient networks, and/or other ad-hoc/mesh network technologies.

Wireless power transfer is a process of transmitting electrical energy from a power source, such as an ancillary device, to an electrical device such as haptic textile 1004. For example, wireless power transfer can be achieved by implementing various power transferring technologies, such as inductive coupling or resonant induction.

An ancillary electronic device located on the ear 1010, akin to a phone earpiece, receives power or data wirelessly through flexible touch surface layer 102, as shown in FIG. 1(*a*). Alternatively, an ancillary electronic device located on the neck or chest 1020, akin to a necklace, receives power or data wirelessly through the flexible touch surface layer. Also, an ancillary electronic device located on the wrist 1030, like a watch or wrist-oriented electronic device (i.e., wristband), receives power or data wirelessly through the flexible touch surface layer. Alternatively, an ancillary electronic device located on the finger 1040, like a ring-oriented communication device, receives power or data wirelessly through the flexible touch surface layer. Furthermore, an ancillary electronic device located in a pocket 1050, like a cell phone receives power or data wirelessly through the flexible touch surface layer. An ancillary electronic device 1060 located in or on handbag 1006, backpack, luggage or other textile-covered carrying container may receive power and/or data wirelessly through the flexible touch surface layer.

While exemplary embodiments of ancillary electronic devices have been shown and described above, it will be obvious to those skilled persons in the art that more electronic device types and their locations both on and off the body can be implemented. It should be noted that the power supplied to the haptic textile could be transferred from other devices. The power could be used to charge those devices or act as an activation mechanism allowing the device to pass a threshold activation energy level that allowed the device to behave in a way it could not on its own due to power constraints.

An advantage of using a haptic device capable of being powered by remote power supply via wireless connection is that the haptic device can be smaller in size and lighter in weight because it does not need a large battery, or it may not need a battery. Another benefit for using a haptic device capable of being powered by a wireless power transfer is that the devices have more physical space for housing haptic actuation components with power being supplied by a remote power supply. The ancillary haptic devices, for example, can also be used in series with the haptic textile or as additional haptic communication channels.

FIG. 11 is a flowchart 1100 illustrating a process of wirelessly transferring power and/or data between haptic textile and an ancillary electronic device in accordance with one embodiment of the present invention. At block 1102, a process for providing textile haptic feedback receives a first activating signal. Upon calibrating sensors in accordance with a predefined parameter, the process is capable of continuously monitoring surrounding environment according to the predefined parameter. For example, a user can calibrate the predefined parameter(s) to indicate which event(s) should be detected. After sensing an event associating to the haptic textile, the process generates the first activating signal in response to the event. The process issues a contact haptic signal in response to a contact detected by the haptic textile. Alternatively, the process is also capable of issuing an alert haptic signal in response to a motion detected by the haptic textile.

At block 1103, the process identifies one or more haptic threads woven in a haptic textile in accordance with the first activating signal. The process is further capable of determining a haptic texture pattern on the surface of haptic textile in accordance with the first activating signal.

At block 1104, the process identifies one or more functions 1105-1107 requested by the first activating signal and is capable of responding in concert or separately. If the process identifies that a haptic response is required, block 1108 is activated. If the process identifies that a data response is required, block 1109 is activated. Alternatively, if the process identifies that a power response is required, block 1110 is activated.

At block 1108, the process generates a first haptic feedback on a first portion of a surface of the haptic textile via activation of one or more first haptic threads in response to the first activating signal. Upon receiving a second activating signal, the process identifies one or more second haptic threads woven in a haptic textile in accordance with the second activating signal. The process subsequently generates a second haptic feedback on a second portion of the surface of the haptic textile via activation of the one or more second haptic threads in response to the second activating signal. The process is further capable of reconfiguring at least a portion of surface texture of the haptic textile changing from a first surface characterization to a second surface characterization in accordance with the first activating signal.

At block 1109, the process generates a data transfer signal for transmitting information between the haptic textile and the ancillary electronic device. The process is capable of communicating with the ancillary electronic device via wireless communications network.

At block 1110, the process generates a power transfer signal to transfer power between the haptic textile and the ancillary electronic device via wireless power transfer.

While particular embodiments of the present invention have been shown and described, it will be obvious to those skilled in the art that, based upon the teachings herein, changes and modifications may be made without departing from this invention and its broader aspects. Therefore, the appended claims are intended to encompass within their scope of all such changes and modifications as are within the true spirit and scope of the exemplary embodiment(s) of the present invention.

What is claimed is:

1. A system comprising:
   a haptic textile comprising a plurality of haptic threads configured to provide haptic feedback, wherein the haptic feedback includes varying surface textures or vibrations propagated to an entire surface or at a discrete point of the haptic textile; and
   an ancillary electronic device configured to transfer data to or from the haptic textile.

2. The system according to claim 1, wherein the ancillary electronic device is configured to transfer data via a wireless communications bus.

3. The system according to claim 1, wherein the ancillary electronic device is configured to transfer data via a conductive contact-based communications bus.

4. The system according to claim 1, wherein the ancillary electronic device is configured to be a wearable device.

5. The system according to claim 4, wherein the ancillary electronic device is configured to be worn on at least one portion of a body of a user selected from the group consisting of: an ear, a wrist, a neck, a chest, and a finger.

6. The system according to claim 1, wherein the ancillary electronic device is configured to be held in a pocket.

7. The system according to claim 6, wherein the ancillary electronic device is a cell phone.

8. The system according to claim 1, wherein the surface texture or vibrations are varied by controlling an input energy to the plurality of haptic threads.

9. A method comprising:
   transmitting information between a haptic textile comprising a plurality of haptic threads configured to provide haptic feedback and an ancillary electronic device, wherein the haptic feedback includes varying surface textures or vibrations propagated to an entire surface or at a discrete point of the haptic textile.

10. The method of claim 9, wherein said transmitting is completed through a wireless communications network.

11. The method according to claim 9, wherein the surface texture or vibrations are varied by controlling an input energy to the plurality of haptic threads.

12. A system comprising:
a haptic textile comprising a plurality of haptic threads configured to provide haptic feedback, wherein the haptic feedback includes varying surface textures or vibrations propagated to an entire surface or at a discrete point of the haptic textile; and
an ancillary electronic device configured to transfer power to the haptic textile.

13. The system according to claim 12, wherein the ancillary electronic device is configured to transfer power via a wireless communications bus.

14. The system according to claim 12, wherein the ancillary electronic device is configured to transfer power via a conductive contact-based communications bus.

15. The system according to claim 12, wherein the ancillary electronic device is configured to be a wearable device.

16. The system according to claim 15, wherein the ancillary electronic device is configured to be worn on at least one portion of a body of a user selected from the group consisting of: an ear, a wrist, a neck, a chest, and a finger.

17. The system according to claim 12, wherein the ancillary electronic device is configured to be held in a pocket.

18. The system according to claim 17, wherein the ancillary electronic device is a cell phone.

19. The system according to claim 12, wherein the surface texture or vibrations are varied by controlling an input energy to the plurality of haptic threads.

* * * * *